United States Patent
Gehrmann

(10) Patent No.: US 10,992,472 B2
(45) Date of Patent: Apr. 27, 2021

(54) SYSTEMS AND METHODS FOR SECURE ROLL-OVER OF DEVICE OWNERSHIP

(71) Applicant: PCMS Holdings, Inc., Wilmington, DE (US)

(72) Inventor: Christian M. Gehrmann, Lund (SE)

(73) Assignee: PCMS Holdings, Inc., Wilmington, DE (US)

( * ) Notice: Subject to any disclaimer, the term of this patent is extended or adjusted under 35 U.S.C. 154(b) by 143 days.

(21) Appl. No.: 15/554,199

(22) PCT Filed: Feb. 26, 2016

(86) PCT No.: PCT/US2016/019861
§ 371 (c)(1),
(2) Date: Aug. 28, 2017

(87) PCT Pub. No.: WO2016/138431
PCT Pub. Date: Sep. 1, 2016

(65) Prior Publication Data
US 2018/0270064 A1 Sep. 20, 2018

Related U.S. Application Data

(60) Provisional application No. 62/126,038, filed on Feb. 27, 2015.

(51) Int. Cl.
*H04L 9/32* (2006.01)
*H04W 4/70* (2018.01)
(Continued)

(52) U.S. Cl.
CPC ............ *H04L 9/3213* (2013.01); *H04L 9/006* (2013.01); *H04L 9/3247* (2013.01);
(Continued)

(58) Field of Classification Search
CPC ....... H04W 4/60; H04W 4/70; H04W 12/002; H04W 12/0027; H04W 8/00; H04W 4/50;
(Continued)

(56) References Cited

U.S. PATENT DOCUMENTS 9,681,296 B2 * 6/2017 Meyerstein ....... H04W 12/0403
10,171,286 B2 * 1/2019 Seed ................... H04L 41/0273
(Continued)

FOREIGN PATENT DOCUMENTS

EP 2398206 A1 12/2011

OTHER PUBLICATIONS

3rd Generation Partnership Project(3GPP), TR 33.812 V9.2.0, "Technical Specification Group Services and System Aspects, Feasibility Study on the Security Aspects of Remote Provisioning and Change of Subscription for Machine to Machine (M2M) Equipment (Release 9)", Jun. 2010, 87 pages.

(Continued)

*Primary Examiner* — Daniel B Potratz
*Assistant Examiner* — D'Arcy Winston Straub
(74) *Attorney, Agent, or Firm* — Condo Roccia Koptiw LLP

(57) ABSTRACT

Systems, methods, and/or techniques for transferring ownership or rolling-over machine-to-machine (M2M) and/or internet of things (IoT) devices from a first owner to a second owner may be disclosed. For example, at a M2M and/or IoT device, a roll-over token and/or a message with the roll-over token may be received. The roll-over token may be configured to be used to transfer ownership and/or update credentials, and/or the roll-over token may be configured to be requested by a first device management server (DMS) associated with the first owner and/or may be generated by a reset server (RS), for example, in response to (Continued)

the request by the first DMS. A validity of the roll-over token may be checked or determined.

20 Claims, 15 Drawing Sheets

(51) Int. Cl.
| | | |
|---|---|---|
| *H04W 4/50* | (2018.01) | |
| *H04W 12/04* | (2021.01) | |
| *H04W 12/00* | (2021.01) | |
| *H04W 4/60* | (2018.01) | |
| *H04L 9/00* | (2006.01) | |
| *H04W 12/06* | (2021.01) | |
| *H04L 29/06* | (2006.01) | |

(52) U.S. Cl.
CPC ............ *H04L 9/3273* (2013.01); *H04L 63/06* (2013.01); *H04L 63/08* (2013.01); *H04L 63/0807* (2013.01); *H04W 4/50* (2018.02); *H04W 4/60* (2018.02); *H04W 4/70* (2018.02); *H04W 12/002* (2019.01); *H04W 12/0023* (2019.01); *H04W 12/0027* (2019.01); *H04W 12/04* (2013.01); *H04W 12/06* (2013.01)

(58) Field of Classification Search
CPC ..... H04L 9/006; H04L 9/3213; H04L 9/3247; H04L 9/3273; H04L 63/06; H04L 63/08; H04L 63/0807
See application file for complete search history.

(56) References Cited

U.S. PATENT DOCUMENTS

| | | | | |
|---|---|---|---|---|
| 2009/0253409 | A1* | 10/2009 | Slavov | H04L 63/0823 455/411 |
| 2010/0106967 | A1* | 4/2010 | Johansson | H04W 4/60 713/158 |
| 2011/0128911 | A1* | 6/2011 | Shaheen | H04W 72/02 370/328 |

OTHER PUBLICATIONS

Dierks et al., "The Transport Layer Security (TLS) Protocol Version 1.2", Network Working Group, Request for Comments: 5246, Category: Standards Track, Aug. 2008, 92 pages.

European Telecommunications Standards Institute (ETSI), TS 102 690 V2.1.1, "Machine-to-Machine Communications (M2M), Functional Architecture", Oct. 2013, 332 pages.

Farrell, S., "Securely Available Credentials Protocol", Network Working Group, Request for Comments: 3767, Category: Standards Track, Jun. 2004, 25 pages.

Gustafson et al., "Securely Available Credentials (SACRED)—Credential Server Framework", Network Working Group, Request for Comments: 3760, Category: Informational, Apr. 2004, 22 pages.

IEEE, "IEEE Standard for Local and Metropolitan Area Networks—Part 15.4: Low-Rate Wireless Personal Area Networks (LR-WPANs)", IEEE Std 802.15.4™, IEEE Computer Society, Sep. 5, 2011, 314 pages.

IEEE, IEEE Standard for Information technology—Telecommunications and information exchange between systems—Local and metropolitan area networks—Specific requirements Part 3: Carrier Sense Multiple Access with Collison Detection (CSMA/CD) Access Method and Physical Layer Specifications Amendment: Data Terminal Equipment (DTE) Power via Media Dependent Interface (MDI), IEEE 802.3af, Jun. 2003, 133 pages.

IETF, "Constrained RESTful Environments (Core)", Available at https://datatracker.ietf.org/wg/core/documents, Retrieved on Sep. 22, 2017, 3 pages.

Kaufman, C., "Internet Key Exchange (IKEv2) Protocol", Network Working Group, Request for Comments: 4306, Category: Standards Track, Dec. 2005, pp. 1-99.

Kent et al., "Security Architecture for the Internet Protocol", Network Working Group, Request for Comments: 4301, Category: Standards Track, Dec. 2005, pp. 1-101.

Lee et al., "Uniform Resource Identifier (URI): Generic Syntax", Network Working Group, Request for Comments: 3986, Category: Standards Track, Jan. 2005, pp. 1-61.

Maes et al., "Physically Unclonable Functions: A Study on the State of the Art and Future Research Directions", in Towards Hardware-Intrinsic Security, Security and Cryptology, Available at http://citeseerx.ist.psu.edu/viewdoc/download?doi=10.1.1.460.5759&rep=rep1&type=pdf 2010, pp. 1-36.

OneM2M, "OneM2M-TR-0008-Security-V1.0.0", TR 0008, Apr. 10, 2014, pp. 1-46.

Open Mobile Alliance, "OMA Device Management Server Delegation Protocol", Candidate Version 1.3, Oct. 9, 2012, 33 pages.

Rescorla et al., "Datagram Transport Layer Security", Network Working Group, Request for Comments: 4347, Category: Standards Track, Apr. 2006, pp. 1-25.

* cited by examiner

SYSTEMS AND METHODS FOR SECURE ROLL-OVER OF DEVICE OWNERSHIP

CROSS-REFERENCE TO RELATED APPLICATIONS

This application is the National Stage Entry under 35 U.S.C. § 371 Patent Cooperation Treaty Application No. PCT/US2016/019861, filed Feb. 26, 2016, which claims the benefit of U.S. Provisional Patent Application No. 62/126,038, filed Feb. 27, 2015, which is hereby incorporated by reference as if fully set forth herein.

BACKGROUND

Machine to Machine (M2M) and/or Internet of Things (IoT) may be an Internet paradigm, that may be used to remotely configure and control a very large amount of electronic equipment (e.g., M2M and/or IoT units or devices) and may open up additional possibilities with respect to services such as automotive, industry control, traffic management and building automation, may reduce cost for maintenance, surveillance, production, transport and communications, and/or the like. In M2M and/or IoT, different M2M/IoT units or devices may be directly connected to the Internet and, consequently, vulnerable to network-based attacks. As such, to help reduce such attacks, the M2M and/or IoT units or devices may be authenticated to help make sure protected communications may be allowed over the Internet, To authenticate such units or devices, there may be credentials in place on the M2M and/or IoT units or devices. The credentials may be used to securely authenticate such units or devices with a back-end system such as a device management server (DMS) and, for the back-end system to in turn to authenticate the different M2M and/or IoT units or devices. In an example, credential provisioning for secure communication establishment may be based on Universal Integrated Circuit Card (UICC) credentials (e.g., including subscriber identity module (SIM) credentials). Unfortunately, UICC-based authentication (e.g., including SIM-based authentication) and/or other authentication methods (e.g., when UICC authentication may not be available such as when a UICC card such as a SIM card may not be in a M2M and/or IoT unit or device) may be too expensive, may not be suitable for switching credentials to a new owner of a M2M and/or IoT unit or device, may not be suitable for M2M and/or IoT units or devices that may not have a UICC card (e.g., a SIM card) therein, and/or the like.

SUMMARY

Systems, methods, and/or techniques for transferring ownership or rolling-over machine-to-machine (M2M) and/or internet of things (IoT) devices from a first owner to a second owner may be disclosed. For example, at a M2M and/or IoT device, a roll-over token and/or a message with the roll-over token may be received. The roll-over token may be configured to be used to transfer ownership and/or update credentials, and/or the roll-over token may be configured to be requested by a first device management server (DMS) associated with the first owner and/or may be generated by a reset server (RS), for example, in response to the request by the first DMS. A validity of the roll-over token may be checked or determined. Further, a uniform resource identifier (URI) for a second DMS associated with the second owner may be extracted from the roll-over token. A connection to the second DMS based on the URI may be established, a mutual authentication may be performed, and/or a secure channel may be established with the second DMS using one or more credentials and token or roll-over information that may be associated with the roll-over token. The one or more credentials may be updated to match the second owner and/or the second DMS associated therewith and/or a secure connection may be established with the second DMS based on the updated one or more credentials. In examples, the roll-over token may be configured to be generated based a pre-configured configured credentials on the M2M and/or IoT device and the RS. Further, the mutual authentication and secure channel between the second DMS may be configured to be established based on a combination of device individual keys associated with the M2M and/or IoT device and a generic symmetric key shared between the RS and M2M and/or IoT devices in the domain. Additionally, in examples, transferring or rolling-over M2M and/or IoT devices from the first owner to the second owner may use or be based on one or more of the following: symmetric key-based credentials and/or public key-based credentials. The M2M and/or IoT unit or device may also decrypt the roll-over token or the message with the roll-over token; send an identity associated with the M2M and/or IoT device to the second DMS configured to be verified thereby and/or used to receive the updated one or more credentials; decrypt the one or more updated credentials; authenticate and/or protect the secure channel; and/or the like.

Further, in examples herein, systems, methods, and/or techniques for transferring ownership or rolling-over machine-to-machine (M2M) and/or interact of things (IoT) devices from a first owner to a second owner may include performing one or more of the following, at a reset server (RS). For example, at the RS, a roll-over request may be received from a first DMS associated with the first owner, the roll-over request may be verified, a roll-over token that may be configured to be used to transfer ownership and/or update credentials may be generated, and/or the roll-over token may be sent to the first DMS and roll-over confirmation information to a second DMS associated with the second owner to facilitate transferring ownership and/or updating credentials to the second owner. In examples the roll-over token may be configured to be generated based a pre-configured credentials on the M2M, and/or IoT device and the RS. Additionally, the roll-over confirmation information may include at least one of the following: the roll-over token, a symmetric verification key generated using a generic secret shared between the RS and each of the M2M and/or IoT devices in the domain. The symmetric verification key may be configured to be used to authenticate the M2M and/or IoT device during updating or transferring of ownership of the M2M and/or IoT device. The RS may further receive a confirmation from the second DMS of the ownership being transferred. The confirmation may be configured to be received prior to generating the roll-over token and enabling the ownership to be transferred and/or may be configured to be digitally signed.

Additionally, in examples herein, systems, methods, and/or techniques for transferring ownership or rolling-over machine-to-machine (M2M) and/or internet of things (IoT) devices from a first owner to a second owner may include performing one or more of the following, at a first DMS. For example, at the first DMS, an agreement with a second DMS associated with the second owner may be established to transfer ownership of the M2M and/or IoT devices, a roll-over request based on the agreement may be generated; the roll-over request may be sent to the second DMS, a roll-over request confirmation may be received from the second DMS, for example, in response to the roll-over request and/or validating the roll-over request confirmation, a roll-over token request may be sent to a reset server (RS), for example if the roll-over request may be valid, a roll-over token may be received from the RS, for example, in response to the roll-over token request where the roll-over token may be configured to be used to transfer ownership and/or update credentials, and/or for example, via multicast or broadcast, the roll-over token may be sent to the M2M and/or IoT devices to facilitate transferring ownership and/or updating credentials to the second owner.

Also, in examples herein, systems, methods, and/or techniques for transferring ownership or rolling-over machine-to-machine (M2M) and/or internet of things (IoT) devices from a first owner to a second owner may include performing one or more of the following, at a second DMS. For example, at the second DMS, an agreement with a first DMS associated with the first owner may be established to transfer ownership of the M2M and/or IoT devices; a roll-over request based on the agreement may be received from the first DMS and/or the roll-over request may be verified and/or validated; a roll-over request confirmation may be sent to the first DMS, for example, in response to the roll-over request and/or the roll-over request confirmation may be verified and/or validated; roll-over verification information may be received from a reset server (RS) configured to generate a roll-over token based on the roll-over request from the first DMS and/or the roll-over request confirmation; one or more credential request may also be received for the M2M and/or IoT units or devices; and/or one or more updated credentials may be sent to the M2M and/or IoT devices in response to credential requests and may be generated, for example, using the roll-over verification information. According to examples herein, at the second DMS, a determination or check of whether one or more credential requests may be missing from one or more of the M2M and/or IoT devices may be made; a request may be sent to the one or more M2M and/or IoT devices for which the one or more credential requests may be missing; the one or more credential requests that may be missing from the one or more M2M and/or IoT devices may be received and/or verified; and/or one or more updated credentials may be sent to the one or more M2M and/or IoT devices for which the one or more credential requests may be missing.

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to the examples herein that may solve one or more disadvantages noted in any part of this disclosure.

BRIEF DESCRIPTION OF THE DRAWINGS

A more detailed understanding of the embodiments disclosed herein may be had from the following description, given by way of example in conjunction with the accompanying drawings.

DETAILED DESCRIPTION

A detailed description of illustrative embodiments may now be described with reference to the various Figures. Although this description provides a detailed example of possible implementations, it should be noted that the details are intended to be exemplary and in no way limit the scope of the examples described herein.

As described herein, machine-to-machine (M2M) and/or Internet of Things (IoT) may be an Internet paradigm that may change technology. For example, the possibility to remotely configure and control a large amount of electronic equipment with M2M may open up additional and/or new possibilities with respect to services such as automotive, industry control, traffic management, building automation, and/or the like and may reduce cost for maintenance, surveillance, production, transport and communications, and/or the like. In examples, this may be achieved if the principles for configuration and update of the M2M units or devices may be both secure and cost efficient in terms of device management methods (e.g., routines) and principles.

Figure 1:
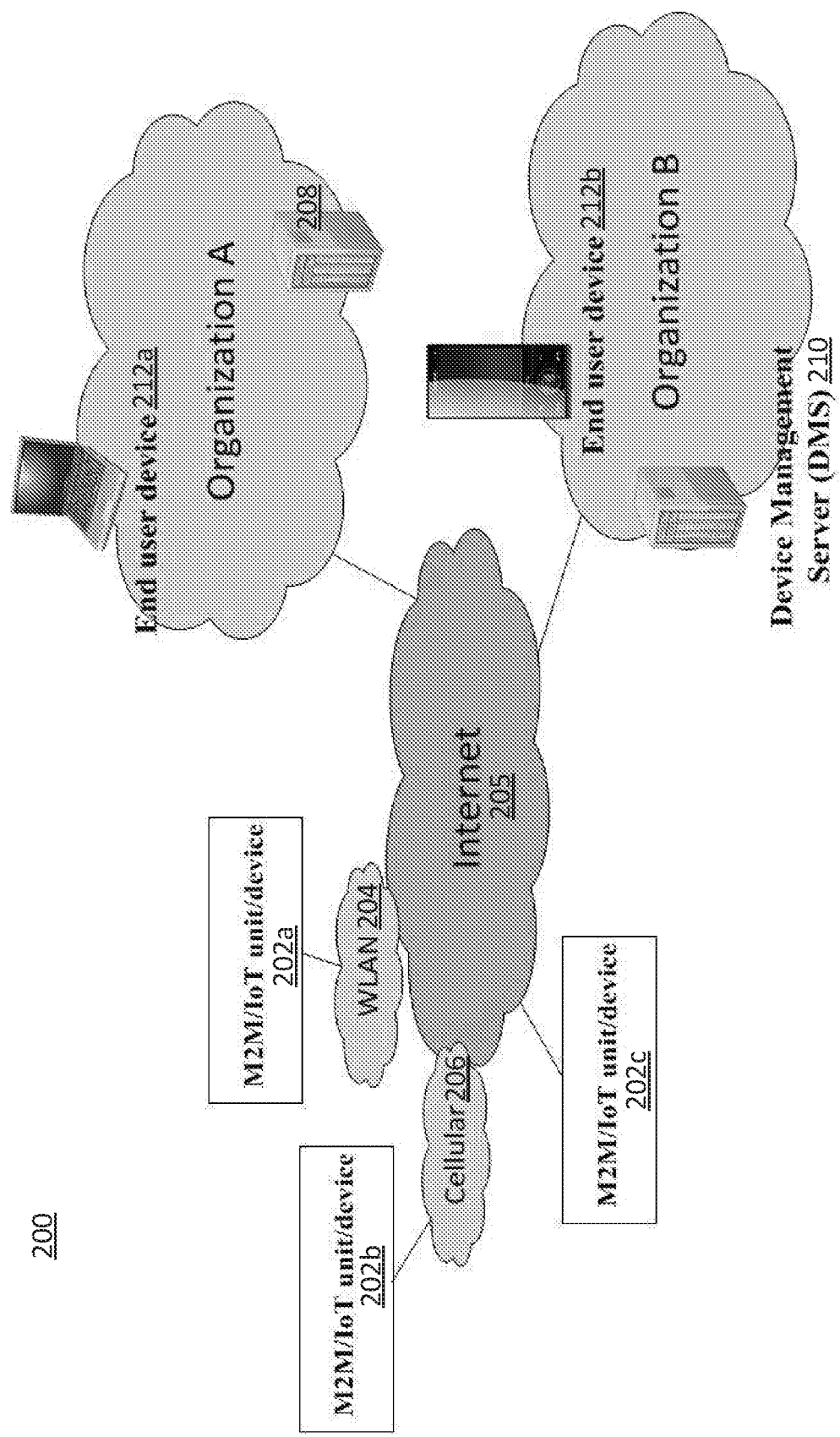
FIG. 1 illustrates an example of a M2M and/or IoT network.
Figure 11A:
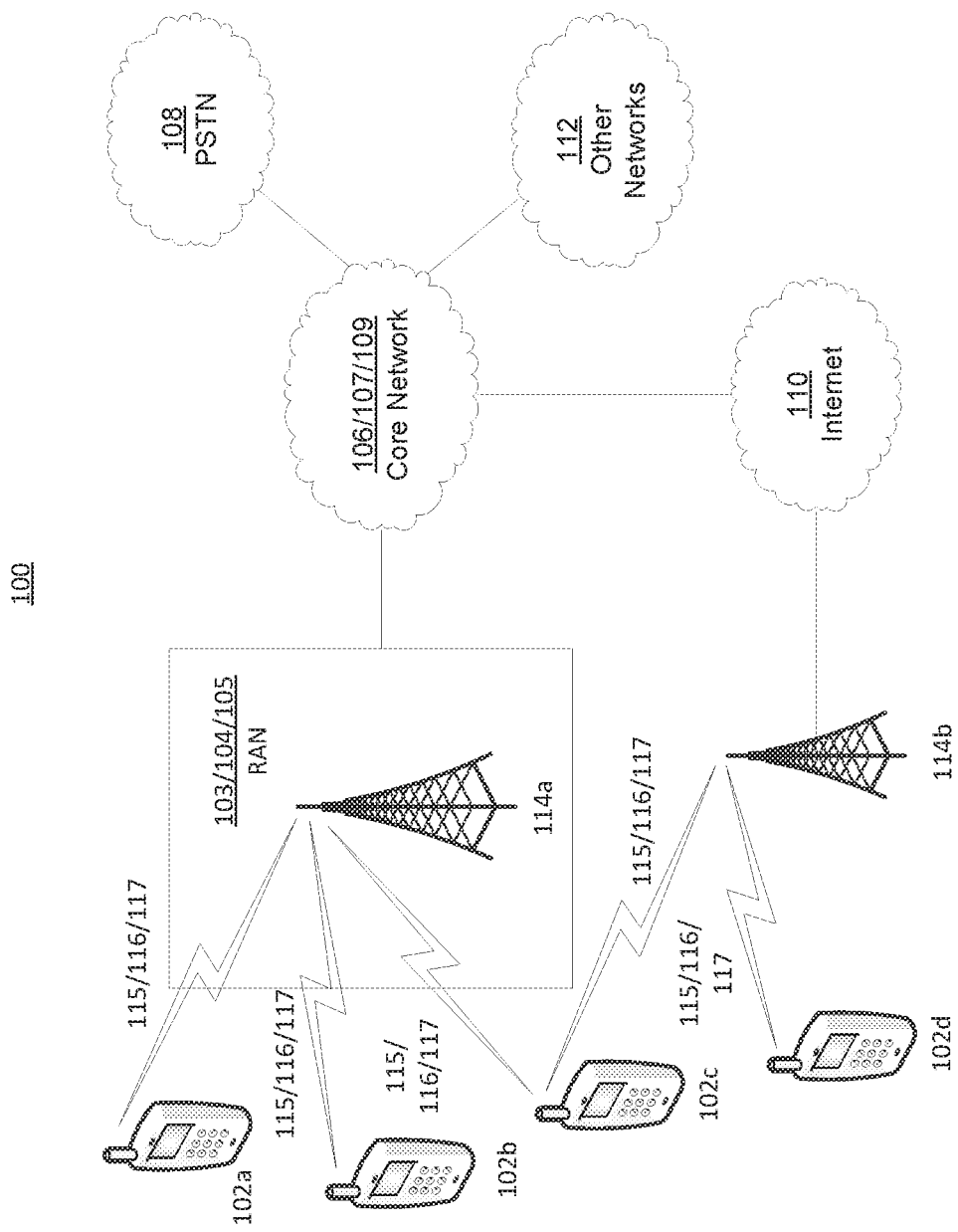
FIG. 11A depicts a diagram of an example communications system in which one or more disclosed examples may be implemented and/or may be used with one or more of the examples described herein.
Figure 11B:
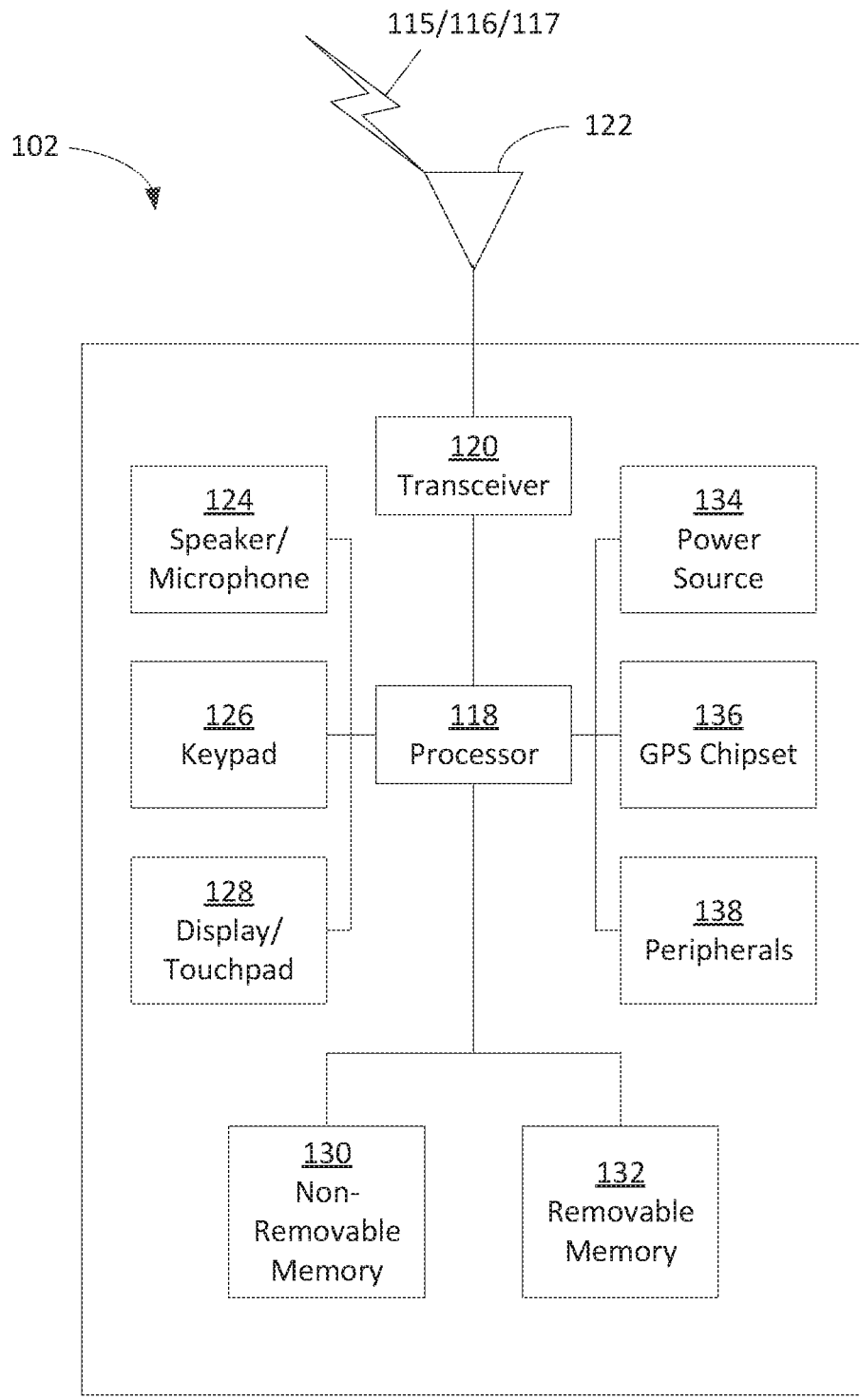
FIG. 11B depicts a system diagram of an example wireless transmit/receive unit (WTRU) that may be used within the communications system illustrated in FIG. 11A.

FIG. 1 illustrates an example of a M2M and/or IoT network 200 that may include M2M and/or IoT units or devices 202*a-c* (e.g., that may be the same or similar to the WTRUs 102*a-d* in FIG. 11B). According to an example, in the system or network 200, the M2M and/or IoT units or devices 202a-c may be networked and/or may be controlled and/or operated by back-end servers such as one or more device management servers 208, 210 and/or by an end-user device 212 such as smart phones, computers such as laptop computers or desktops, tablets, and/or the like. The M2M and/or IoT units or devices 202a-c may have general Internet connectivity (e.g., to the Internet 205), but the access network used may be of different types including, but not limited to, cellular access, WLAN access, fixed broadband access or corporate network access, and/or the like. For example, as shown in FIG. 1, a M2M and/or IoT device or unit 202a may be connected to a WLAN 204 through which it may connect to the Internet 205, the M2M device or unit 202b may be connected to cellular network 206 (e.g., that may be one or more of the networks described in FIGS. 11A and 11okC-E) through which it may connect to the Internet 205, and the M2M and/or IoT unit or device 202c may be directly connected to the Internet 205.

Figure 2:
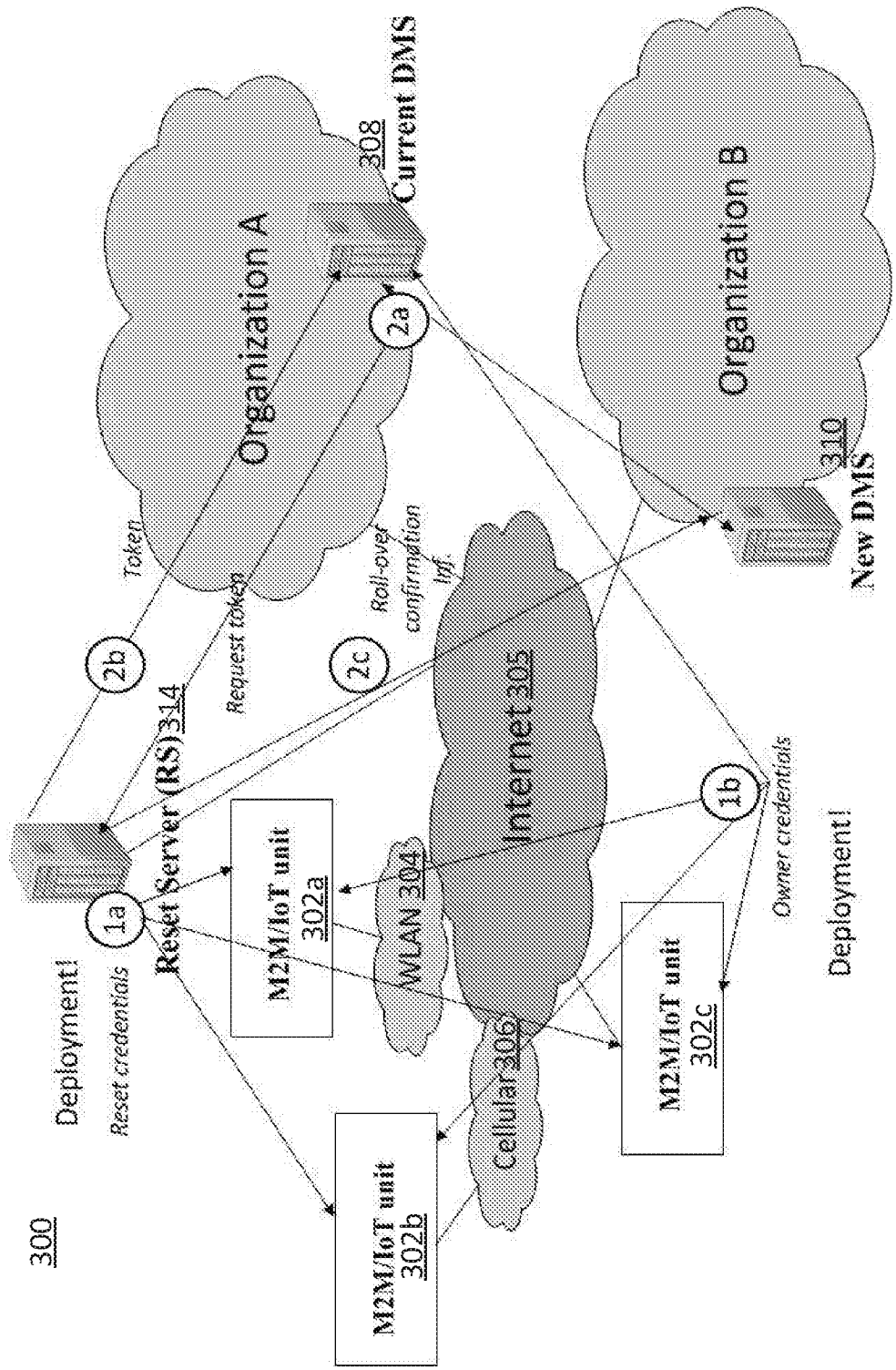
FIGS. 2-4 illustrate examples for rolling over (e.g., from one owner to another) M2M and/or IoT units or devices in a M2M and/or IoT network.
Figure 3:
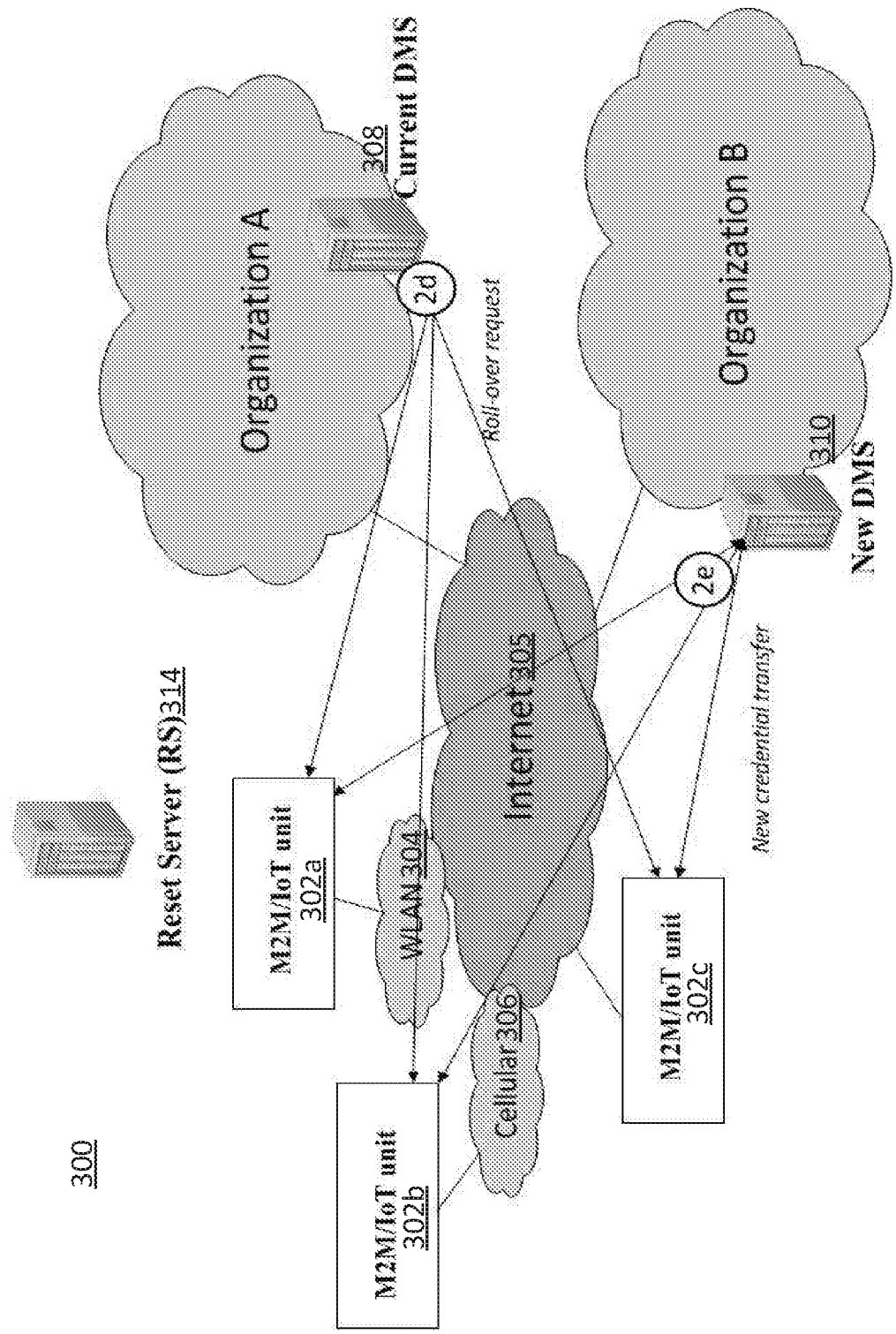
Figure 4:
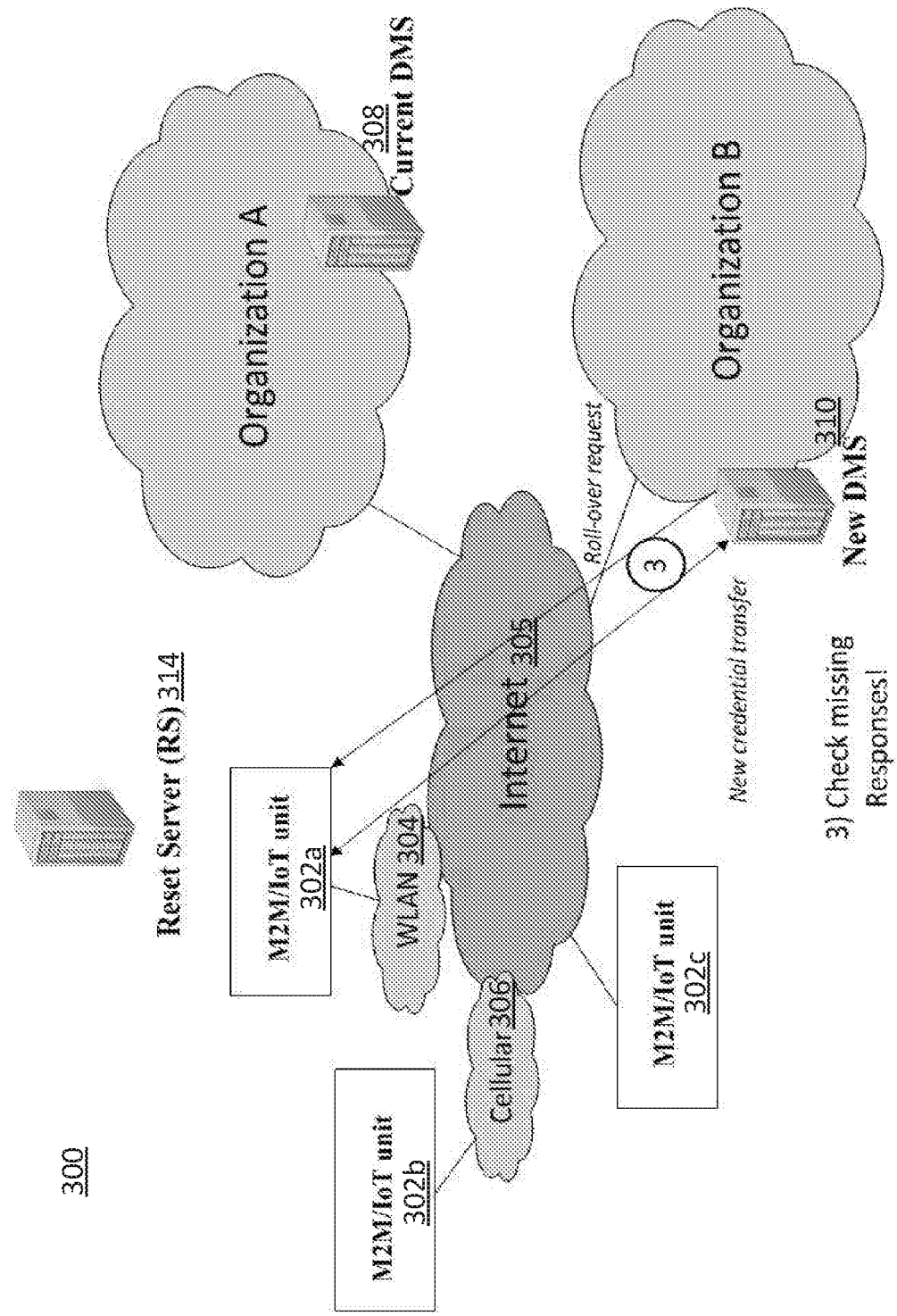

As described herein, M2M and/or IoT device or units such as M2M and/or IoT devices or units 202a-c in FIG. 1 and/or M2M and/or IoT devices or units 302a-c in FIGS. 2-4 may include credentials that may be used, for example, for authentication as described herein. For example, credential handling for M2M devices or units may be subject to standardization by, for instance, the OneM2M joint standardization effort between international standardization bodies such as ARIB, ATIS, CCSA, ETSI, TIA, TTA and TTC. This organization may try to harmonize specifications and increase interoperability for M2M systems. Security including secure identification of M2M nodes may be within the scope of the standardization effort. So far, the work may be immature and/or incomplete. For example. OneM2M may have identified a desire to distinguish between limited session based key used to protect actual M2M service layer communication and long lived keys. An example of long lived keys may include a long-lived shared secret between the M2M and/or IoT unit or device and a back-end system that may be used to a derive key for the protection of the service layer. In relation to the examples herein, OneM2M may also identify security threats for deletion and replacement of "long lived" M2M unit or device keys.

According to examples, an advanced M2M credential management may be provided and/or used. With respect to more advanced M2M credential management, OneM2M may have identified a desire for secure initial enrollment and update but without detailed principles or mechanisms (e.g., methods). The model may be aligned with a model such as ETSI (e.g., as described herein, for example, below)

According to examples herein, ETSI may define an M2M functional architecture (e.g., an ETSI M2M architecture) for M2M services using an IP capable underlying network such as those defined by 3GPP, TISPAN and 3GPP2. The focus may include and/or may be on methods and/or procedures for bootstrapping, security, and management as well as charging.

The ETSI M2M architecture may provide and/or assume a security relation between the M2M unit or device and/or gateway domain and the network domain where the services nodes may be located and/or may reside. This relationship may be defined through a root key, for example, a shared symmetric key between the M2M node and the M2M service provider. The root key may be used for subsequent authentication with the M2M service provider. According to an example, on the network side, the root key may be managed by a key server such as a M2M Authentication Server (MAS). The provisioning may be performed or done by the boot strap server or the M2M Service Bootstrap Function (MSBF). According to one or more examples, there may be different (e.g., three) techniques in the ETSI architecture described that may indicate how the key may be provisioned into the M2M unit device. For example, in one example, the root key may be provisioned to the M2M unit or device at manufacture or at deployment. In this example, it may be the responsibility of the M2M service provider to make sure that the procedure or method may be secure and reliable. According to an additional example, the root key may be derived from network credentials such as SIM credentials. Further, in an example, the root key may be provisioned in an access independent method (e.g., if and/or when the M2M service provider and the network operator may not share a common trust relation).

Although ETSI may provide credentials for an initial bootstrapping principle, other methods (e.g., such as those described herein), may be used, for example, when updating the credentials when, for instance, the M2M units or devices switch owner. One or more examples may provide and/or define methods and/or techniques that may be used, for example, when or if M2M units or devices may switch owners. According to an example, ETSI key provisioning may be general and/or may be used for M2M/IoT examples. Unfortunately, as described herein, such ETSI key provisioning may be limited to a first time bootstrap and may not include a procedure or method for updating credentials and, in particular, may not include a procedure or method for efficiently switching owner of a set (e.g., a large set) of M2M/IoT units or devices that maybe deployed or used in a M2M network (e.g., such as the M2M networks 200 and/or 300 described herein). Examples herein may provide such procedures and/or methods (e.g., for updating credentials and/or switching owners) and may be compatible with ETSI in examples.

In an example, IETF may include a set of protocols (e.g., that may be standardized) for transfer of public key credentials between devices or units. The framework may include direct transfer of credentials between devices or units including use of a credential server. The credentials on this server may be used and/or stored therein and downloaded when needed by the same or a different device (e.g., a mobile phone, PDA, or laptop computer). For example, the framework may be used for devices or clients to upload and download credentials for mobility (i.e., a user may be able to use its credentials at many different locations), which is different from secure and efficient transfer of ownership of roll-over of credentials issued to several IoT devices. As such, the framework and protocols (e.g., in IETF) may not address one or more problems that one or more examples herein may address including, for example, how to update (e.g., efficiently) security credentials for a number (e.g., a large number or a number of units or devices being large enough that the cost for manually resetting the units or devices being rolled over or transferred may become too high) of units or devices during an ownership change.

Further, in the example (e.g., as shown in FIG. 1), the different M2M and/or IoT units or devices 202a-c may be connected to the Internet and, consequently, vulnerable to network based attacks. As such (e.g., to combat such attacks), the M2M units or devices may be authenticated and protected communications may be allowed over the Internet. In particular (e.g., independent of a particular Internet access technology), there may be credentials in place on the M2M and/or IoT units or devices such that the units or devices may securely authentication to the back-end system (e.g. the DMS). Similar, it may be possible for the back-end system (e.g., the DMS) in turn to authenticate the different M2M and/or IoT units or devices. According to an example, the M2M and/or IoT units or devices may be provisioned with trusted communication security credentials such that one or more methods for setting up secure communication channels with external entities such as the Internet Key Exchange (IKE) and Internet Security Protocol (IPSEC) protocol suits and/or Us and DTLS protocol suits. With a communication domain such as one for a single operator cellular network domain, credential provisioning for secure communication establishment may be based on Universal Integrated Circuit Card (UICC) credentials (e.g., including SIM-based credentials).

Unfortunately, UICC including SIM-based authentication may have one or more drawbacks including one or more of the following. A dedicated hardware UICC card may be too expensive for a massive set of M2M and/or IoT units or devices. Further, in an example, there may not be methods in place to efficiently and remotely switch credentials in a SIM so that the control over the ID (e.g., a SIM ID including an ICCID and/or an IMSI) and credentials in the cards may switch ownership (e.g., may be taken over by a new owner of the units or devices such as when they may be sold or for other reason need to switch ownership). Additionally, according to an example, the credentials in the SIM card may be tightly coupled to the current operator and/or owner such that when switching over ownership the previous owner may still possess essential credential information of the units or devices.

Further, in one or more typical M2M examples including one or more examples described herein, a single operator access or even cellular network access may not be assumed, but some M2M units may be have direct internet connection through other connections or technologies such as fixed network access through Power over Ethernet (PoE) cables, local wireless access points over IEEE 802.15.4 networks like ZigBee, Bluetooth, through WLAN access, and/or the like. As such, UICC based authentication and secure network communication set-up may not a viable option as one or more of the M2M and/or IoT units or devices may not have a SIM card or embedded SIM. Additionally, in an example, a traditional way or manner of handling such an issue by using different identification and/or authentication methods for different units may not be cost efficient (e.g., as they may use the end applications to handle several different authentication options in parallel). Further, the number of different M2M and/or IoT units or devices for an application may be large and one or more of the M2M and/or IoT units or devices may be resource constraint devices with limited memory and computing power. This may imply that there should be cost efficient and light weight techniques to provision the M2M and/or IoT units or devices with the credential information and/or to enable efficient roll-over of credentials for the M2M and/or IoT units or devices when transferring ownership (e.g., when the units or devices may get a new owner). As such, the credential roll-over methods, procedures, and/or techniques described herein should and may work for resource constrained devices and/or not compromise the security of the system (e.g., which may not be the case for existing methods, procedures, and/or techniques). Further, in examples (e.g., for resource constraint IoT or M2M units and/or devices), the roll-over procedure and/or methods should work for symmetric key credentials as well as public key based credentials as those (is the those here symmetric key credentials or public key based credentials may be too computational heavy to handle resource constraint units or devices.

The system and/or methods herein may address one or more of the problems associated with current M2M or IoT units or devices and/or systems. For example, the systems and/or methods herein may provide more efficient and secure procedures for a roll-over of credentials (e.g., rolling over credentials during an ownership change from a new owner form a previous owners) for M2M or IoT units or devices (e.g., for a set including a large number of M2M or IoT units).

In the systems and/or methods herein, a trusted node may be included and/or provided in the M2M or IoT system. The busted node may have or may include the power to control a roll-over method or procedure. In an example, the trusted node may be a Reset Server (RS) as shown in FIG. 2 at 1a. In an example, the RS may participate in the roll-over method or procedure to enable and/or help ensure the roll-over (e.g., the transfer of credentials from one owner to another owner) may be a valid, authenticated, and/or succeed. For example, the RS may be used to issue new' credentials for a new owner to IoT units or devices that may have been previously used by another owner and sold or otherwise disposed of according to examples herein.

FIGS. 2-4 illustrates an example for rolling over (e.g., from one owner to another) M2M and/or IoT units or devices 302a-c (e.g., that may be the same or similar to the WTRUs 102a-d in FIG. 11B and/or the IoT units or devices 202a-c in FIG. 1 including the functionality thereof) in a M2M and/or IoT network 300 (e.g., that may be similar to the network 200). According to an example, in the system or network 300, the M2M and/or IoT units or devices 302a-c may be networked and/or may be controlled and/or operated by back-end servers such as device management servers such as a first DMS server 308 (e.g., the current DMS server) and/or a second DMS server 310 (e.g., the new DMS server). As shown, Organization A may have the first DMS 308 associated therewith and Organization B may have the second DMS 310 associated therewith. As described herein, the M2M and/or IoT units or devices 202a-c may have general Internet connectivity (e.g., to the Internet 305), but the access network used may be of different types including, but not limited to, cellular access, WLAN access, fixed broadband access or corporate network access, and/or the like. For example, as shown in FIGS. 2-4, the M2M and/or IoT device or unit 302a may be connected to a WLAN 304 through which it may connect to the Internet 305, the M2M and/or IoT device or unit 302b may be connected to cellular network 306 (e.g., that may be one or more of the networks described in FIGS. 11A and 11C-E) through which it may connect to the Internet 305, and the M2M and/or IoT unit or device 302c may be directly connected to the Internet 305, According to examples herein, ownership of one or more of the M2M and/or IoT units or devices 302a-c may be transferred (e.g., rolled over and/or a roll-over method may be performed to transfer ownership) from a first organization such as Organization A to another or second organization such as Organization B. In such a transfer from the first to second organization, control and/or operation may be transferred form the first DMS server 308 (e.g., the current DMS server) to the second DMS server 310 (e.g., the new DMS server).

As shown in FIGS. 2-4, the M2M and/or IoT network 300 may include a Reset Server (RS) 314. The RS 414 may be connected (e.g., directly as shown and/or indirectly via a cellular network, WLAN, and/or the like) to the Internet 305 through which it may communicate with the M2M and/or IoT units or devise 302a-c and/or the first and/or second DMSs 308, 310 (e.g., to roll-over credentials and transfer ownership). As described herein, the RS server 314 may have or may include the power to perform and/or control a roll-over method or procedure. The roll-over method or procedure may include a method or procedure to rollover (e.g., transfer) ownership including credentials from the first organization or Organization A to the second organization or Organization B. In an example, the RS 314 may participate in the roll-over method or procedure to enable the roll-over (e.g., the transfer of credentials) to be valid, authenticated, and/or succeed (e.g., for the roll-over of credentials from the first organization or Organization A to the second organization or Organization B to be valid the RS 314 may have to be involved in the roll-over method or procedure).

To roll-over the M2M and/or IoT units or devices 302*a-c* from the first organization or Organization A to the second organization or Organization B, the roll-over method and/or procedure may be performed as described herein. For example, the roll-over method and/or procedure according to examples herein may include 1*a*-3 as shown in FIGS. 2-4. In an example, at 1 (e.g., at or during system deployment), a group of M2M and/or IoT units or devices (e.g., 302*a-c*) may be equipped with credentials (e.g., different type of credentials). In examples, the credentials may include, for instance, one or more keys such as symmetric keys that may be shared with the first or original (e.g., owner's of the IoT or M2M units or devices) DMS and identifiers of the IoT and/or M2M units or devices including a MAC address and/or any other unique identifier that may be assigned to an IoT or M2M unit or device. In one or more additional examples, these credentials may be public key credentials, i.e. a private-public key pair and a corresponding certificate.

According to an example, the credentials may include reset credentials that may be associated with and/or connected to an RS such as the RS 314 in the system and may be common to the M2M and/or IoT units or devices (e.g., 302*a-c*) in the group and/or owner credentials (FIG. 2. at 1*b*) that may be associated with and/or connected to the back-end DMS (e.g., the DMS 308, for example, before ownership transfer and/or the DMS 310 after ownership transfer) of the owner of the M2M and/or IoT units or devices of the system. For example, the reset credentials may include a symmetric key that may be shared between the devices (e.g., the IIoT unit or device) and the reset server (e.g., in a symmetric key example) and/or a public key or certificate of the reset server (e.g., in a public key example).

In an example, at 2 (e.g., when a set of M2M' IoT units switch owners such as from the first organization or Organization A to the second organization or Organization B), the following (e.g., method, procedure, and/or action) may be performed. For example, at 2*a*, the current owner or first owner that may be associated with the first organization or Organization A via the first DMS (e.g., the current DMS) may agree (e.g., as described herein, for example, below) with a new owner or second owner that may be associated with the second organization or Organization B via the second DMS, that an ownership roll-over (e.g., a transfer of ownership of M2M and/or IoT units or devices) should take place. The first and/or second DMSs may provide, generate, and/or make a joint proof request (e.g., as described herein, for example, below) of the roll-over at 2A. The joint proof request may be sent (e.g., from the first DMS), at 2*a*, to the RS as shown. The joint proof request may include both the old and the new DMS confirming (e.g., explicitly) the request (e.g., or a message) by digitally signing it and transfer the signed request to the RS.

At 2*b*, a roll-over token (e.g., a customized roll-over token) may be generated and/or sent to a DMS. For example, the RS may generate a roll-over token. The roll-over token may include proof to the M2M and/or IoT unit of a credential ownership transfer and/or which DMS (e.g., the second or new DMS) may be the new DMS the M2M and/or IoT unit or device may now belong to. For example, this roll-over token may include a token that proves or a proof to the IoT units belonging to the old DMS that a ownership transfer has been requested and that this transfer may be supervised by the RS (e.g., which is the entity the IoT units use and/or trust for supervision of ownership transfer to a new DMS). The roll-over token may be sent from the RS and/or received by the first DMS, at 2*b* (e.g., as a response or in response to the request of 2*a*).

According to an example, at 2*c*, a roll-over confirmation may be generated and/or sent to a DMS. For example, the RS may generate a roll-over confirmation information. The roll-over confirmation may include, for example, the roll-over token and/or some secret key material that may be used by the second or new DMS to securely updated the credentials on the M2M and/or IoT units or devices. In an example, the secret key material may be verification key sent to the new DMS that may make it possible for the IoT units or devices to successfully verify the authenticity of the new DMS before those units or devices may accept the new DMS as their new master or owner. As shown, the roll-over confirmation information may be sent from the RS and/or received by the second DMS, at 2*c*. The roll-over confirmation information may be sent in any suitable message over an authenticated and encrypted channel (e.g., as described herein).

At 2*d*, a broadcast or multicast reset message may be generated and/or sent. For example, at 2*d*, the first DMS may generate and send out a broadcast or multicast reset message to the M2M and/or IoT units or devices (e.g., 302*a-c*) that may be subject to roll-over. According to an example, the broadcast or multicast reset message may include the roll-over token. The reset message may include an identifier or ID of the second DMS such as an IP address, MAC address, other device identifier, and/or the like, an encrypted nonce or a one-way hash of the public key of the second. DMS, and/or the like (e.g., as described herein) and/or may be in any suitable format including the information and/or formats described herein. In examples, this message may be repeated a number of times (e.g., to get a higher assurance that the intended receiving M2M and/or IoT units or devices that may be having ownership transferred actually receive the multicast request). In an additional and/or alternative example, at 2*d*, this message including the roll-over token (e.g., or a key that may be or include the roll-over token) may be broadcasted and/or multicasted (e.g., sent) by the RS and/or the second DMS (e.g., instead of the current DMS sending the token as described in examples). Further, in an example, at 2*d*, the roll-over token may not be sent to the M2M and/or IoT units or devices. For example, each M2M and/or IoT units or devices may connect (e.g., at a particular time interval) to the first DMS (and/or the RS and/or the second DMS) at 2D. According to an example, the M2M and/or IoT units or devices may receive the token from the first DMS (and/or the RS and/or the second DMS), at 2*d* when connecting thereto.

At 2*e*, additional credentials (e.g., new credentials for the new owner such as Organization B) may be generated and/or provided to the M2M and/or IoT units or devices such that the additional credentials or new credentials may be replace the prior credentials and may be used to subsequently authenticate the M2M and/or IoT units or devices. For example, at 2*e*, each M2M and/or IoT units or devices that may receive the message at 2d may communicate and/or contact the second DMS. The second DMS may generate and/or create new credentials (e.g., that may include private and/or public keys, symmetric keys or trusted public key values, and/or the like) and may transfer (e.g., securely) the new credentials to the M2M and/or IoT units or devices that may have been transferred.

In an example, at 3, a determination or check (e.g., by the DMS that it may have received the correct number of update request for the transfer of ownership) may be performed for the credential updates. For example, at 3, the second DMS may check and/or determine whether it may have received credential updates from each of the M2M and/or IoT units or devices being transferred (e.g., the expected units or devices). In an example (e.g., if the second DMS may not have received the credential updates from an expected unit or device), the second DMS may send, at 3, dedicated request messages to each of the M2M and/or IoT units or devices that may not have responded at 2d.

As such, in examples (e.g., as shown in FIGS. 2-4), secure switching of ownership of credentials to network connected M2M and/or IoT units or devices may be based on the use of a trusted RS (e.g. 314) that may issue a dedicated ownership switch token (e.g., a roll-over token) that may be broadcast or multicast or delivered to the units or devices that may be subject to the ownership roll-over and, thus, may making the actual owner switch take place and/or performed.

The examples (e.g., systems and/or methods) described herein may provide one or more of the following. The examples may enable or allow roll-over of credentials through sending a multicast and/or broadcast message (e.g., a single multicast and/or broadcast message) to the M2M and/or IoT units or devices that may be subject to the ownership switch. This may imply and/or provide that the communication overhead may be reduced and the switching procedure or method (e.g., the roll-over method or procedure) may be simplified (e.g., if a large number of M2M and/or IoT units or devices may be subject to the roll-over method or procedure).

Further, in an example, the RS may be involved in the method or procedure by a roll-over token a single roll-over token) that may be used to switch ownership for a set of units or devices. In such an example, the trusted entity, RS, may not have detailed knowledge or requirement of management of the units or devices that may be subject to the roll-over method or procedure.

The examples herein may provide cooperation between the current owner and/or the current DMS (e.g., the first organization or Organization A and/or the first DMS 308) and an independent trusted third entity, the RS, for the switch to take place. This may imply that the security of the current and the future device owner organization may be improved and/or guaranteed. For example, as shown through the examples herein, it may be possible to provide protocols such that the new owner may not have access to secrets and/or confidential information that may have been used in the past by the current owner and/or the future owner may receive assurances and/or guarantees that the current owner (e.g., Organization A) may not have access to future secrets and/or confidential information that may be used by the new owner (e.g., Organization B).

Further, in an example, the roll-over method or procedure may be secure and/or may be used with symmetric key cryptography (e.g., as one example) and/or public-key based cryptography (e.g., as an additional example). Further, the roll-over method or procedure may be used with resource constraint M2M and/or IoT units or devices that may be capable of handling symmetric key operations (e.g., and not public key operations).

According to examples, one or more of the following notations may be defined and/or used in the example roll-over methods or procedures. For example, a M2M and/or IoT unit or device may be denoted by u, a set of M2M and/or IoT units or devices may be denoted by U, a subset of U being subject to roll-over may be denoted by $V \subset U$, the identity of the set V (e.g., the set subject to roll-over) may be denoted by $ID_V$, $\forall u \in U$ (e.g., the set of units U (e.g., all units) that may include V), the identity of the set U (e.g., the units u that may include the set of (e.g., all) units u form which the subset subject to roll-over V may be a subset and/or a part of), may be by $ID_u$, which may be or may include a unique identifier of u or the units in U, and/or $\forall u \in U$, a unique resource identifier for a unit u in U may be denoted by $URI_u$ which may be unique resource identifier of a unit u of the set of units U. Further, in examples herein, $\{Pr_A, Pu_A\}$ may be the private-public key pair of the first or current DMS, $\{Pr_B, Pu_B\}$ may be the private-public key pair of the second or new DMS, and/or $\{Pr_{RS}, Pu_{RS}\}$ may be the private-public key pair of the RS. Additionally, in examples, $ID_A$ may be the identity of the first or current DMS, $ID_B$, may be the identity of the second or new DMS, and/or $URI_B$ may be a unique resource identifier of the second or new DMS. A combination of the examples herein for symmetric key-based and/or public-key based credentials may be used and/or provided and/or may be possible according to the examples herein (e.g., when the units or devices in V may include a mixture of units or devices that may be capable and/or respectively may not be capable of performing public key operations).

For example, a secure roll-over (e.g., a roll-over method and/or technique) for symmetric key-based credentials may be provided and/or used according to examples herein. Such examples may be used, for example, when the M2M/IoT units may have (e.g., may only have) symmetric key capability. The RS and/or the first or second DMSs may have public key capabilities as well in examples herein.

According to examples, one or more of the following may be used in the symmetric key-based roll-over method or procedure. For example, for a set V, a group common symmetric reset key may be denoted by $RK_V$, $\forall u \in V$ (e.g., the set of units u in V that may be subject to the roll-over) a symmetric, long-lived, shared key between U and the current owner DMS (e.g., the first DMS) may be denoted by $K_u = K_{u1} \| K_{u2}$, for example, a key that may include separate (e.g., two separate) key parts $K_{u1}$, $K_{u2}$ and/or $\forall u \in V$ (e.g., for the set of units V subject to the roll-over), $KS_u$ may be denoted for a symmetric key shared between u and the new DMS used to protect the transfer of new credentials to u.

According examples herein, the secure roll-over method or procedure may include one or more phases (e.g., two distinct phases). During a first phase (e.g., the deployment phase at 1 in FIGS. 2-4), units or devices u may be pre-configured with secret material (e.g., $RK_V$). There may be one or more different examples and/or options for pre-configuring the units or devices including, for example, at device manufacture, during a M2M and/or IoT units or devices customization process, and/or through direct manual configuration (e.g., at device deployment). As a result of the configuration in the first phase, $\forall u \in V$ (e.g., the set V of units subject to a roll-over) may share a common unique reset key, $RK_V$, with RS. Additionally, $\forall u \in V$ may share a secret, long-lived key, $K_u = K_{u1} \| K_{u2}$ (e.g., that may include two key parts) with the owner or the first or current DMS.

As such, in an example, the credential set after deployment for each unit u may include at least: $\{ID_u, RK_V, K_u\}$. Further, according to an example, the RS may have an indication or a registration (e.g., may have registered) that organization A may be the current owner of the units in set V and the RS may store or include a database of the number of unique units within V In examples herein, a PKI may be provided and/or used (e.g., and/or may be provided at 1) such that RS, current DMS and the new DMS securely may verify the public key of the other party.

According to examples herein, the roll-over procedure and/or method (e.g., the method for rolling-over credentials and/or transferring ownership of one or more units or devices) may include one or more of the following. For example, the first or current DMS may be provided a request to transfer ownership of credentials associated with units or devices (e.g., the M2M and/or the IoT units or devices such as 302a-c). The first or current DMS may sign the request for credential transfer (e.g., to the new owner) using private key $Pr_A$ associated with the first or current DMS. The request (e.g., that may be signed by the private $Pr_A$ may include one or more of the following parameters: $ID_V$, $ID_B$, $|V|$, and/or the like where $|V|$ may denote or define the size of the set of units subject to the roll-over method procedure. The signature may be denoted by SIGH and a signed structure ($TR_A$) including the signature may be as follows: $TR_A = \{ID_V, |V|, ID_B, SIG_A\}$.

The first or current DMS may send (e.g., at 2a) $TR_A$ with a list of credential information to the second or new DMS regarding the units being transferred or rolled-over (e.g., units $u_i \in V$, $0 \le i \le n, n=|V|$) or subject to the roll-over or transfer. The credential information may include one or more of the following for the units or devices being rolled-over $\{ID_{u_0}, K_{u_0 2}, URI_{u_0}\}, \{ID_{u_1}, K_{u_1 2}, URI_{u_1}\}, \ldots, \{ID_{u_n}, K_{u_n 2}, URI_{u_n}\}$.

According to an example, the second or new DMS may determine and/or check (e.g., at 2a) the validity of $TR_A$ using $Pu_A$ (e.g., which may be checked using public key signature verification in an example). Further, in an example (e.g., if the validity may be confirmed and/or be ok based on the check or determination), the first or current DMS may generate a counter signature (e.g., and/or the second or new DMS may generate the counter signature and may send the counter signature to the first or current DMS). The counter signature may cover at least the parameters: $URI_B$, $TR_A$, using $Pr_B$ that may confirm the transfer or the roll-over. The counter signature may be defined or denoted by $SIG_B$ and the signed structure including the counter signature itself may be as follows: $TR_B = \{URI_B, TR_A, SIG_A\}$.

The first or current DMS may send (e.g., at 2a) $TR_B$ to RS to request, for example, a roll-over token. For example, the first or current DMS may send the signature structure for the counter signature to trigger a request for a roll-over token. The RS may determine or checks the validity of $TR_B$ using $Pu_A$ and $Pu_B$ (e.g., may verify the validity through the shared PKI, for example, by verifying the digital signature using the public keys). According to an example (e.g., if the validity may be verified), the RS may determine (e.g., look up) the key corresponding to $ID_V$ (e.g., that may include each of the IDs of the units or devices being transferred), which may be $RK_V$. The RS may generate one or more of the following parameters: a sufficient large random nonce, N, a verification key, $VK = PRF(N, RK_V)$, where PRF may denote or represent a suitable Pseudo Random Function, a roll-over token, $T = \{E_{RK_V}(ID_B, URI_B, N, MAC_{RK_V}(ID_B, URI_B, N))\}$, where $E_{RK_V}$ denotes a secure encryption function using the key $RK_V$ or a key derived from $RK_V$, and where $MAC_{RK_V}$ denotes a secure Message Authentication Code (MAC) using the symmetric key $RK_V$ or a key derived from $RK_V$. According to an example, the RS may send (e.g., at 2b and/or 2c) VK and/or the token T over a protected channel to the second or new DMS. The RS may also indicate to or inform the new DMS of the potential difference between the reported size of V and the actual size registered by RS in one example.

The first or current DMS may use a broadcast or multicast (e.g., a broadcast or multicast message) to send (e.g., at 2d) the token T to units or devices in V (e.g., 302a-c) as well as using a reliable channel to send the token T to the new DMS. According to an additional or alternative example, the token T may be broadcasted or multicasted (e.g., at 2d and/or 2e) by the RS and/or the second or new DMS. Further, in an example, the token T may not be sent to the units in V and instead each of the units may connect at a particular time or time interval to the first or current DMS and when connecting may receive (e.g., at 2d) the token T from the first or current DMS.

In an example (e.g., for $\forall u \in V$). the units u may receive (e.g., at 2d and/or 2c) and may decrypt (e.g., via any suitable decryption technique or mechanism) the message that may be multicast or broadcast using $RK_V$. The units u may verify the MAC, also using $RK_V$ using any suitable integrity verification algorithm. According to an example (e.g., if the MAC may be verified), the units u may generate VK (e.g., a verification key as described herein) using the nonce and $RK_N$.

Further, in an example (e.g., for $\forall u \in V$ or for each of the units in the set V), the units may generate a credential protection key, KS, using VK and $K_{u2}$, $KS_u = PRF(VK, K_{u2})$. The units u may use $URI_B$ to set-up a secure channel (e.g., a pure symmetric key-based channel) to the second or new DMS. The secure channel may be authenticated and/or the integrity and confidentiality protected using the key VK. The units u may send (e.g., at 2e) its identity, $ID_u$, to the second new DMS that may use the identity to look up the key $K_{u2}$. The second or new DMS may generate (e.g., at 2e) a new individual long-lived key for the units u, $K'_u = K'_{u1} \| K'_{u2}$. The second or new DMS may send at 2e an encrypted and confidentiality protected (e.g., via or under the key, $KS_u$ that may be derived (e.g., the new credential) through a combination of VK and $K_{u2}$, i.e. $PRF(VK, K_{u2})$) new credential $K'_u$ to the units u. In an example, the units u may receive (e.g., at 2e) and may decrypt the received $K'_u$. The units u may determine or check the integrity of the received message with the new credential using $KS_u$. According to an example (e.g., if the integrity may be verified (e.g., using a message authentication code (MAC), the unit a may delete (e.g., wipes out) the credential $K'_u$ associated with the first or current DMS and/or owner Organization A that may be stored on the device (e.g., in memory) and may replace that credential with $K'_u$.

The second or new DMS may use the list (e.g., the list of roll-over confirmation information at 2c) as a parameter V to determine or check whether the second or new DMS may have received the new key roll-over request from each of the units a in V. In an example (e.g., a unit a may not have responded), the second or new DMS may use the URI information received at 2c) to contact the non-responding units a by sending them the token T and may request that they perform the roll-over method or procedure as described herein (e.g., the actions performed the responding units u at 2e, for example).

The new key, $K'_u$ may then be used by the new owner to authenticate and set-up secure connections with the units or devices in V. In an example, the new key may help ensure the new owner (e.g., Organization B) may not receive confidential information from the prior owner (e.g., Organization A) and vice versa as described herein.

In an example, a roll-over procedure or method may include a secure roll-over or transfer of public key-based credentials. For example, the M2M and/or IoT units or devices may have public key capabilities that may be used in the roll-over procedure or method. According to an example (e.g., in the public key based roll-over procedure or method), for $\forall u \in V$, a unit specific private-public key pair may be provided and denoted by $\{Pr_u, Pu_u\}$ and/or for $\forall u \in V$, a certificate that may be issued by the RS certifying the key $Pu_u$, and the identity $ID_u$ may be provided and denoted by $C_u$.

Similar to the symmetric key-based example, the secure roll-over for public key-based credentials may include one or more phases (e.g., two distinct phases). According to an example (e.g., during an example phase such as the first phase or deployment phase at 1 in FIGS. 2-4), units or devices u (e.g., 302a-c) may be pre-configured with secret material (e.g., private public key pairs, just public keys, or hash values of public keys, IDs, and/or the like). The method or procedure for this pre-configuration may include one or more (e.g., different) methods or options (e.g., at device manufacture and/or through a customization process) or through direct manual configuration. As a result of the configuration in such a phase, the units (e.g., the units in V such as $\forall u \in V$) may securely store the public key of RS or a one-way hash, $h_{RS} = H(Pu_{RS})$, of the public key of the RS. Furthermore, for $\forall u \in V$, the units to may store the public key or a one-way hash, $h_{DMS} = H(Pu_A)$ of the current owner (e.g., Organization A) and/or the first or current DMS. Further, in an example, each unit u may stores a unit unique public-private key pair: $\{Pr_u, Pu_u\}$. This key pair may have been generated, for example, when the units a may have been manufactured and/or may have, for example, been generated using onboard key generation at deployment. In an example, the units u may include or hold a certificate, $C_u$, that may certify by the RS the trustworthiness of the unit public key as well as the identity, $ID_u$, of the unit. In addition, in an example, at device manufacture or first time deployment, the identity, $ID_V$, of the set V, the unit u may belong to may be configured into the units or devices u. As such, in an example, the credential set after deployment for each unit u may include one or more of the following: $\{ID_V, C_u, ID_A, Pr_u, Pu_u, h_{RS}, h_{DMS}\}$. Similar to the symmetric-key based example, the RS may have registered that organization A may be the current owner of the units a in the set V of units subject to transfer or roll-over. As described herein (e.g., in an example), the RS may store and/or may keep a database of the number of unique units in V. Further, according to an example, a PKI may be provided such that the RS, the first or current DMS, and/or the second or new DMS may securely verify the public key of the other party.

According to examples herein, the roll-over procedure and/or method (e.g., the method for rolling-over credentials and/or transferring ownership of one or more units or devices) may include one or more of the following. For example, the first or current DMS may be provided a request to transfer ownership of credentials associated with units or devices (e.g., the M2M and/or the IoT units or devices such as 302a-c), The first or current DMS may sign the request for credential transfer (e.g., to the new owner) using private key $Pr_A$ associated with the first or current DMS. The request (e.g., that may be signed by the private $Pr_A$) may include one or more of the following parameters: $ID_V$, $ID_B$, |V|, and/or the like where |V| may denote or define the size of the set of units subject to the roll-over method procedure. The signature may be denoted by $SIG_A$ and a signed structure ($TR_A$) including the signature may be as follows: $TR_A = \{ID_V, ID_B, SIG_A\}$.

The first current DMS may send (e.g., at 2a) $TR_A$ together with a list of unit identity information to the new DMS regarding the units $u_i \in V$, $0 \leq i \leq n, n = |V|$ subject to the roll-over or transfer. The credential information may include one or more of the following for the units or devices being rolled-over $ID_{u_0}, ID_{u_1}, \ldots, ID_{u_n}$.

According to an example, the second or new DMS may determine and/or check (e.g., at 2a) the validity of $TR_A$ using $Pu_A$ (e.g., which may be checked using public key signature verification in an example). Further, in an example (e.g., if the validity may be confirmed and/or be ok based on the check or determination), the first or current DMS may generate a counter signature (e.g., and/or the second or new DMS may generate the counter signature and may send the counter signature to the first or current DMS). The counter signature may cover at least the parameters: $URI_B$, $TR_A$, using $Pr_B$ that may confirm the transfer or the roll-over. The counter signature may be defined or denoted by $SIG_B$ and the signed structure including the counter signature itself may be as follows: $TR_B = \{URI_B, TR_A, SIG_A\}$.

The first or current DMS may send (e.g., at 2a) $TR_B$ to RS requesting a roll-over token. The RS may determine or checks the validity of $TR_B$ using $Pu_A$ and $Pu_B$ (e.g., which may be received or obtained and/or verified through the share PKI), In an example (e.g., if $TR_B$ may be verified), the RS may generate the roll-over token T. The roll-over token T may be or may include $T = \{ID_V, ID_B, h'_{DMS}, URI_B, SIG_{Pr_{RS}}(ID_V, ID_B, h'_{DMS}, URI_B), Pu_{RS}\}$, where $h'_{DMS} = H(Pu_B)$ and where $SIG_{Pr_{RS}}$ denotes a digital signature using the key $Pr_{RS}$ for the RS or a digital signature using the private key $Pr_{RS}$ over the parameters $ID_V$, $ID_B$, $h'_{DMS}$, $URI_B$ and may be done be the RS that may have access to the private key $Pr_{RS}$.

In an additional or alternative example, the token T may be encrypted using a common (e.g., in the group V) symmetric key similar as the key $RK_V$ used in the example for secure-roll-over using symmetric key-based credentials as described herein.

The RS may send (e.g., at 2b and/or 2c), the token T to the first or current DMS and/or the second or new DMS over a protected channel. The RS may also indicate to or inform the second or new of the potential difference between the reported size of V and the actual size registered by RS in one example.

The first or current DMS may use a broadcast or multicast (e.g., a broadcast or multicast message) to send (e.g., at 2d) the token T to the units u in V (e.g., 302a-c) as well as using a reliable channel to send T to the second or new DMS. According to an additional or alternative example, the token T may be broadcasted or multicasted (e.g., at 2d and/or 2e) by the RS and/or the second or new DMS. Further, in an example, the token T may not be sent to the units in V and instead each of the units may connect at a particular time or time interval to the first or current DMS and when connecting may receive (e.g., at 2d) the token T from the first or current DMS.

In an example (e.g., for $\forall u \in V$), the units u may receive the message (e.g., that may be broadcast or multicast, for example, at 2d and/or 2e) using $h_{RS}$, and the received public key, $Pu_{RS}$, in the token T and by verifying the signature (e.g., verification of the digital signature in the token (e.g., T) that may be generated by the RS using the key $Pu_{RS}$ as described herein). The units u may further verify or determine that the token T may apply to the group it belongs to by verifying the group ID, $ID_V$, in the token T. According to an example (e.g., if the token T may be verified), the second or new current DMS in the units u may be set to $ID_B$ and $h'_{DMS}$ may be stored and/or may replace $h_{DMS}$ in the valid credential set of the units u.

Further, according to an example (e.g., for $\forall u \in V$), the units u may use $URI_B$ to set-up a secure channel (e.g., a standard type of secure channel establishment using, for example, a TLS or MIS protocol) to the second or new DMS. The secure channel may be authenticated and/or integrity and confidentiality protected using the key certificate $C_u$, the trusted DMS hash, $h'_{DMS}$, and/or the public key pairs $\{Pr_B, Pu_B\}$ and $\{Pr_u, Pu_u\}$. In an example, the units u may send (e.g., at 2e) the $URI_u$ to the second or new DMS over the secure channel. Further, according to one example, the second or new DMS may register the new unit with $ID_u$ (obtained from $C_u$) in its unit database and/or list.

In an example, the second or new DMS may generate and/or issue new public keys and a public keys certificate, $C2_u$, to the unit a and may send (e.g., at 2e) them over a protected channel to the units u.

Additionally, as described herein, the second or new DMS may use the list (e.g., the list of roll-over confirmation information at 2c) to determine or check whether the second or new DMS may have received the new key roll-over request from the units u in the set of units V being rolled-over or transferred or subject thereto. In an example (e.g., a unit u may not have responded), the second or new DMS may use the URI information received (e.g., at 2c) to contact all non-responding units a by sending them the token T and may request that they perform the roll-over method or procedure as described herein (e.g., the actions performed the responding units u 2e, for example).

In an example, the new credential $C_u$ (and/or $C2_u$) and $h'_{DMS}$ may be used by the new owner to authentication and/or to form the basis for secure channel establishment between the units u and the second or new DMS. In an example, the new credential may help ensure the new owner (e.g., Organization B) may not receive confidential information from the prior owner (e.g., Organization A) and vice versa as described herein.

Figure 5:
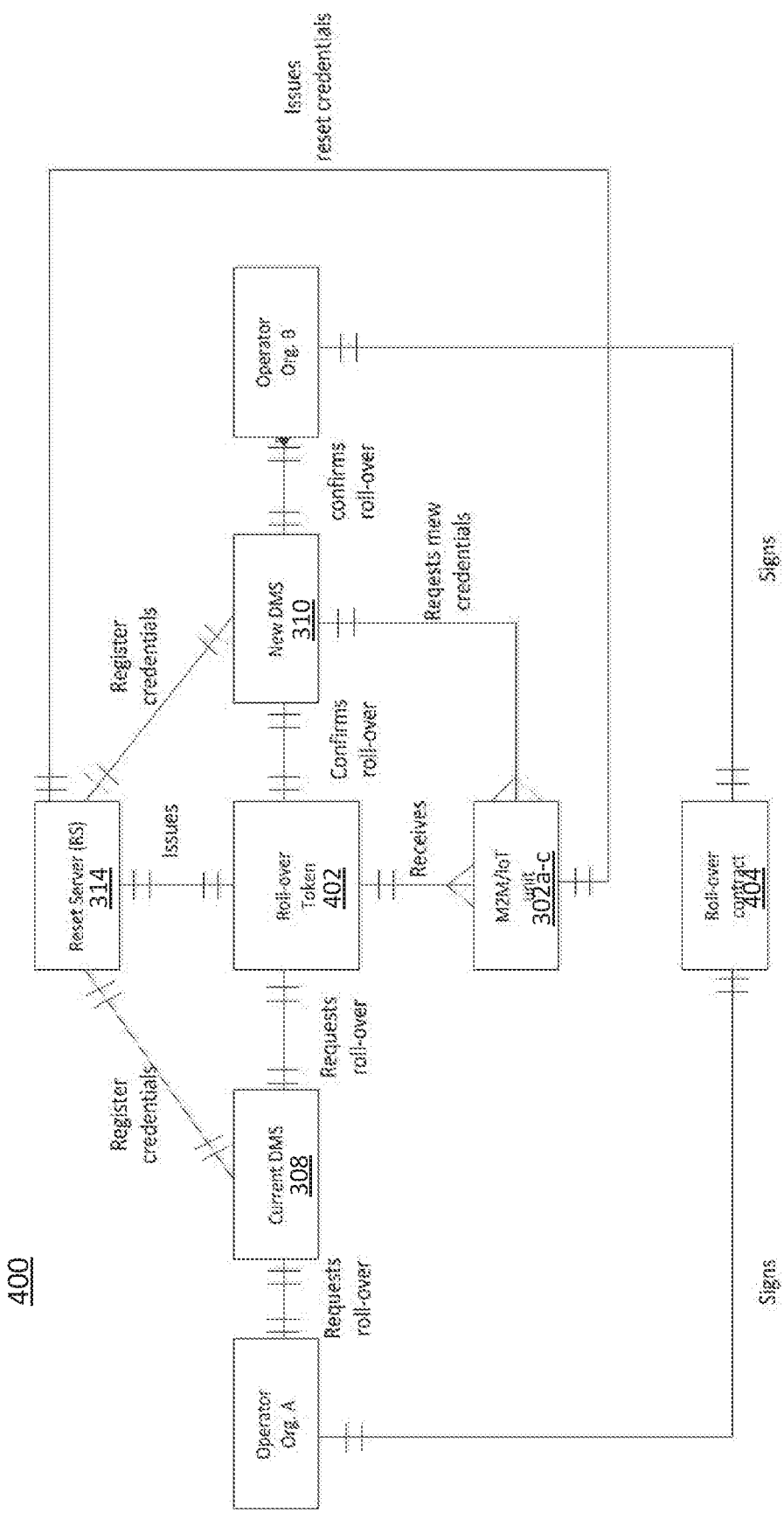
FIG. 5 illustrates an example entity relationship diagram for rolling over M2M and/or IoT units or devices in a M2M and/or IoT network.

FIG. 5 illustrates an example entity relationship diagram 400 for rolling over M2M and/or IoT units or devices a or 302a-c in a M2M and/or IoT network. As shown, the RS 314 may register credentials with the first or current DMS 308 and/or the second or new DMS 310 and/or the credentials for the first or current DMS 308 and/or the second or new DMS 310 may be registered with the RS 314 as described herein. The RS 314 may issue the roll-over token 402 (e.g., T) and/or may issue reset credentials to the M2M and/or IoT units or devices (e.g., 302a-c).

Additionally, in an example as shown, the first or current DMS 308 may be associated with the first organization or Organization A that may request the roll-over and/or may sign a roll-over contract 404 as described herein using a signature or signature structure. The second or new DMS 310 may confirm the roll-over for the second organization or Organization B that may request the roll-over and/or may sign the roll-over contract 404 as described herein using the signature or signature structure.

Further, according to examples as shown, the M2M and/or IoT units or devices u or 302a-c may receive the roll-over token 402, may request new credentials from the second or new DMS 310 and/or the second or new DMS 310 may provide new credentials to the M2M and/or IoT units or devices a or 302a-c. The M2M and/or IoT may also include reset credentials that may be issued by the RS 314 and/or associated therewith that may be used to roll-over and/or transfer ownership as described herein.

Figure 6:
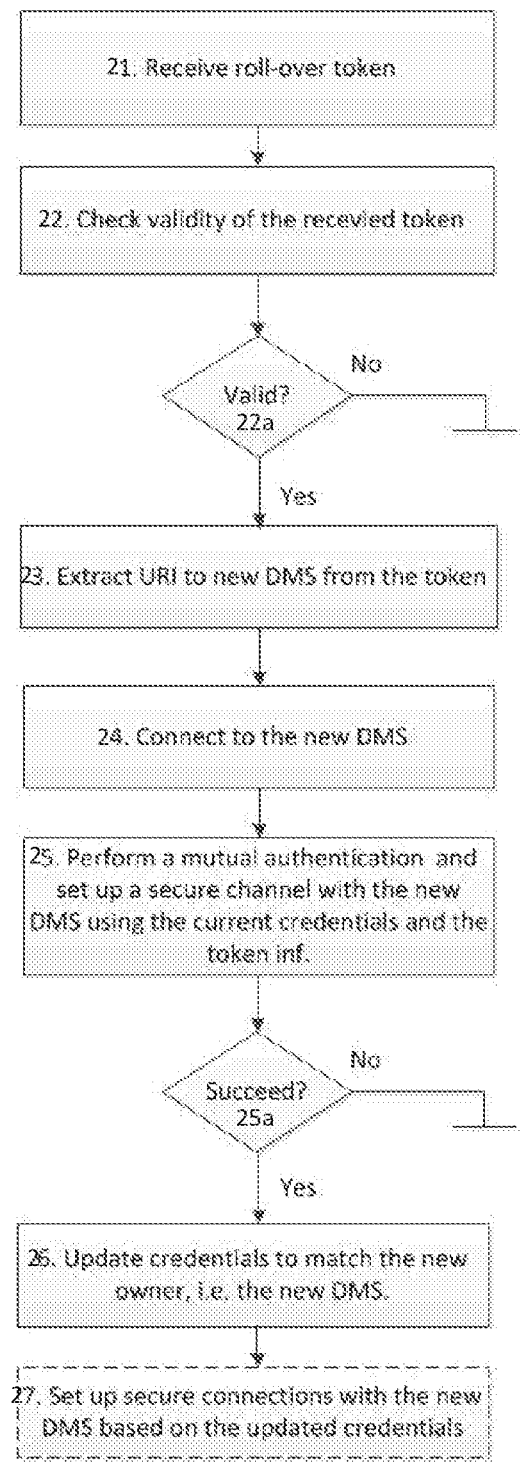
FIG. 6 illustrates an example flow diagram of a method, at a M2M and/or IoT unit or device, for rolling-over a M2M and/or IoT units or devices for one or more of the examples described herein.

FIG. 6 illustrates an example flow diagram of a method, at a M2M and/or IoT unit or device, for rolling-over a M2M and/or IoT units or devices (e.g., one or more of 302a-c) for one or more of the examples described herein. As shown, at 21, the M2M and/or IoT unit or device may receive the roll-over token (e.g., T). The validity of the received token may be determined and/or verified by the M2M and/or IoT unit or device, at 22, as described herein. According to an example (e.g., if the token may not be valid), new credentials or tokens may not be associated with and/or stored in the M2M and/or IoT units or devices. Further, in an example if the token may be valid or verified, for example, if it the check of the MAC or public key signature may be successful or there may be a match as described herein) at 22a, the M2M and/or IoT unit or device may then extract the URI for the second or new DMS from the token at 23. In an example, the token may be valid or verified if a check of the Message Authentication Code (MAC) may be successful (e.g., in a symmetric example) and/or the check of the digital signature may be successful (e.g., in a public key example). In an example, a check of the MAC (e.g., and verifying and/or determining whether the token may be valid) may be done by calculating a check sum one or more fields or values that may be included in the token and comparing the result with the MAC that may be included or part of the token. Further, in an example, a check of the digital signature (e.g., that may verify the token) may be done by making a cryptographic calculation over the signature of the token and then comparing the result with a hash value calculated over one or more fields in the token. If these the two resulting values (e.g., the hash value and cryptographic calculation) coincide or match, the token may be valid. The M2M and/or IoT unit or device may connect to the second or new DMS (e.g., 310), at 24, such that the M2M and/or IoT unit or device may interact with the second or new DMS to perform a mutual authentication and to set up a secure channel there between using the current credentials and the token and/or token information, According to one or more examples, the current credentials may be the identities of the IoT and/or M2M units or devices and the symmetric keys shared between the IoT and/or M2M units or devices and the old DMS and the RS (e.g., in a symmetric example) and/or device specific public key pairs and corresponding certificate issued by RS (e.g., in a public key example).

In an example (e.g., at 25a of the authentication may not succeed), the credentials stored may remain on the M2M and/or IoT unit or device. Further (e.g., at 25a, of the authentication may succeed), the credentials stored on the M2M and/or IoT may be replaced thereby with the new credentials and/or updated with the new credentials (FIG. 6 at 26) associated with the new owner and the second or new DMS. At 27, secure communications may then be established or set up with the new DMS based on the new or updated credentials.

Figure 7:
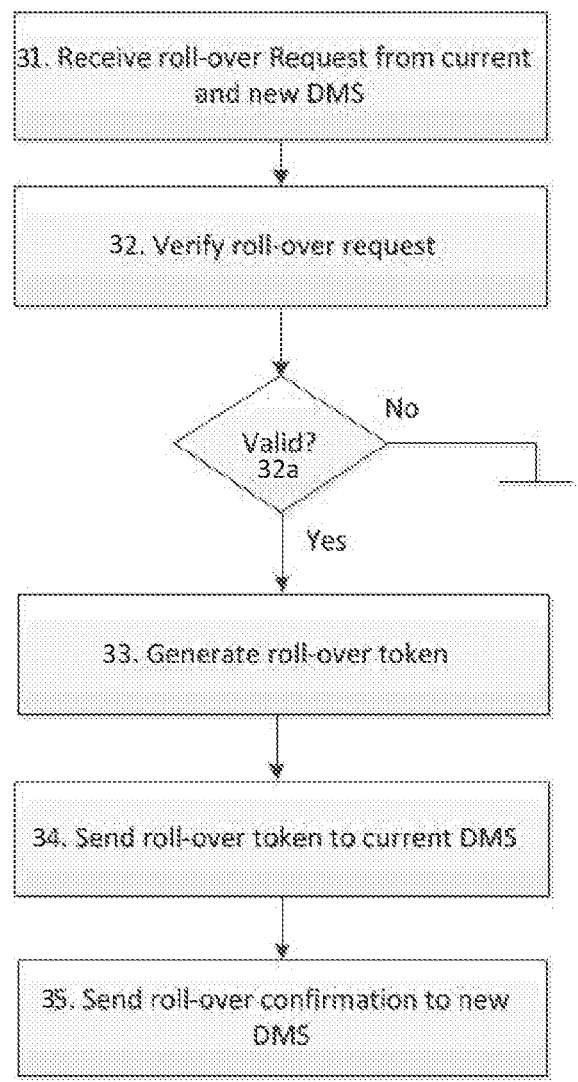
FIG. 7 illustrates an example flow diagram of a method, at a reset server (RS), for rolling-over a M2M and/or IoT units or devices for one or more of the examples described herein.

FIG. 7 illustrates an example flow diagram of a method, at a reset server (RS) (e.g., 314), for rolling-over a M2M and/or IoT units or devices for one or more of the examples described herein. As shown, at 31, the RS may receive a roll-over request from the first or current DMS (e.g., 308) and/or the second or new DMS (e.g., 310). The RS, at 32, may verify the roll-over request (e.g., may determine whether the roll-over request may be valid) as described herein. In an example (e.g., if the roll-over request may not be valid at 32a), the RS may not provide a roll-over token as described herein. Further (e.g., if the roll-over request may be valid at 32*a*), the RS may generate the roll-over token, at 33, as described herein. In one example, at 34, the RS may send the roll-over token to the first or current DMS. In further examples, the RS may send the roll-over token to the second or new DMS. Further, at 35, according to an example, the RS may send a roll-over confirmation or roll-over confirmation information to the second or new DMS.

Figure 8:
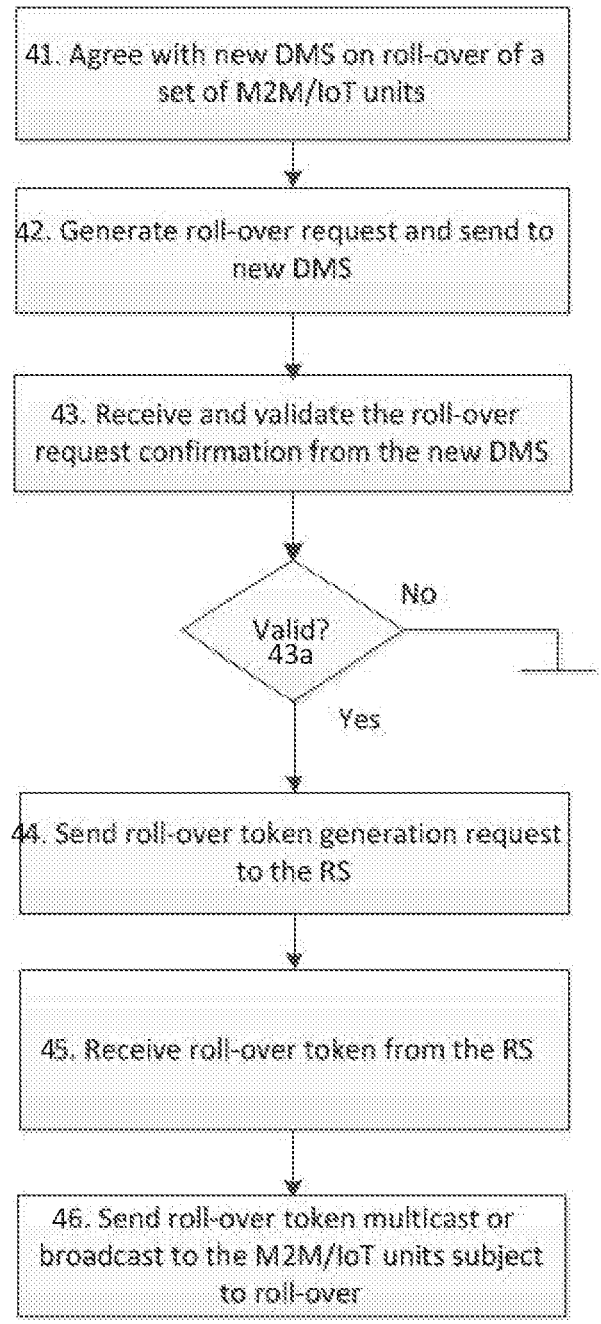
FIG. 8 illustrates an example flow diagram of a method, at a first (e.g., current) DMS, for rolling-over a M2M and/or IoT units or devices for one or more of the examples described herein.

FIG. 8 illustrates an example flow diagram of a method, at a first (e.g., current) DMS (e.g., 308), for rolling-over a M2M and/or IoT units or devices for one or more of the examples described herein. As shown, at 41, the first or current DMS may agree with the second or new DMS (e.g., 310) on a roll-over of a set of M2M and/or IoT units or devices (e.g., and/or may provide a signature and/or signature structure as described herein to indicate such an agreement). At 42, the first or current DMS may generate and/or send a roll-over request to the second or new DMS. The first or current DMS may receive a roll-over request confirmation and/or may validate the roll-over request confirmation at 43. According to an example (e.g., if the roll-over request confirmation may not be valid at 43*a*), the first or current DMS may not request a roll-over token and/or may not transfer ownership of the M2M and/or IoT units or devices. Further (e.g., if the roll-over request confirmation may be valid at 43*a*), the first or current DMS may send a roll-over token request or generation request to the RS, at 44, for example. At 45, the first or current DMS may receive a roll-over token from the RS as described herein. Further, in an example, the first or current DMS may multicast or broadcast the roll-over token (e.g., in a multicast and/or broadcast message) to the M2M and/or IoT units or devices subject to the roll-over or transfer at 46.

Figure 9:
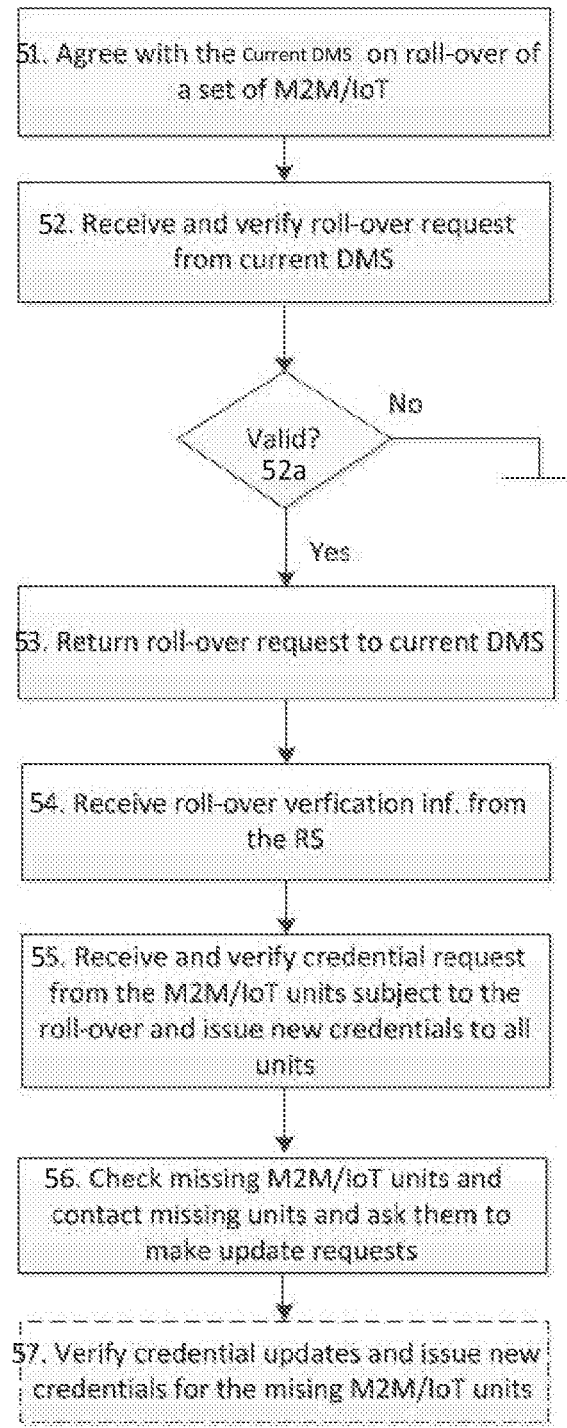
FIG. 9 illustrates an example flow diagram of a method, at a second (e.g., new) DMS, for rolling-over a M2M and/or IoT units or devices for one or more of the examples described herein.

FIG. 9 illustrates an example flow diagram of a method, at a second (e.g., new) DMS (e.g., 310), for rolling-over a M2M and/or IoT units or devices for one or more of the examples described herein. For example, as shown, at 51, the second or new DMS may agree with the first or current DMS (e.g., 308) on a roll-over of a set of M2M and/or IoT units or devices (e.g., and/or may provide a signature and/or signature structure as described herein to indicate such an agreement). At 52, the second or new DMS may receive and/or verify the roll-over request from the first or current DMS. According to an example (e.g., if the roll-over request confirmation may not be valid at 52*a*), the second or new DMS may not return or send a roll-over request to the first or current DMS (FIG. 9 at 53) such that ownership of the M2M and/or IoT units or devices may not be transferred. Further (e.g., if the roll-over request confirmation may be valid at 52*a*), the second or new DMS may send and/or return a roll-over request to the first or current DMS, at 54, for example. At 55, the second or new DMS may receive and/or verify credential requests from the M2M and/or IoT units or devices. Further, at 55 in an example, the second or new DMS may issue new credentials to the M2M and/or IoT units or devices that may be subject to the roll-over and/or that may be rolled-over or transferred. At 56, the second or new DMS may determine or check whether there may be missing credential requests from one or more M2M and/or IoT units or devices subject to the roll-over and may contact the missing units (e.g., with a message, request, or credential as described herein) that may indicate (and/or ask) to them to make an update request. At 57 (e.g., if there may be requests missing from one or more M2M and/or IoT units or devices), the second or new DMS may verify the missing requests that may be received, at 56, and/or may issue new credentials for the requests for the missing M2M and/or IoT units or devices that may be sent (e.g., at 57).

Figure 10:
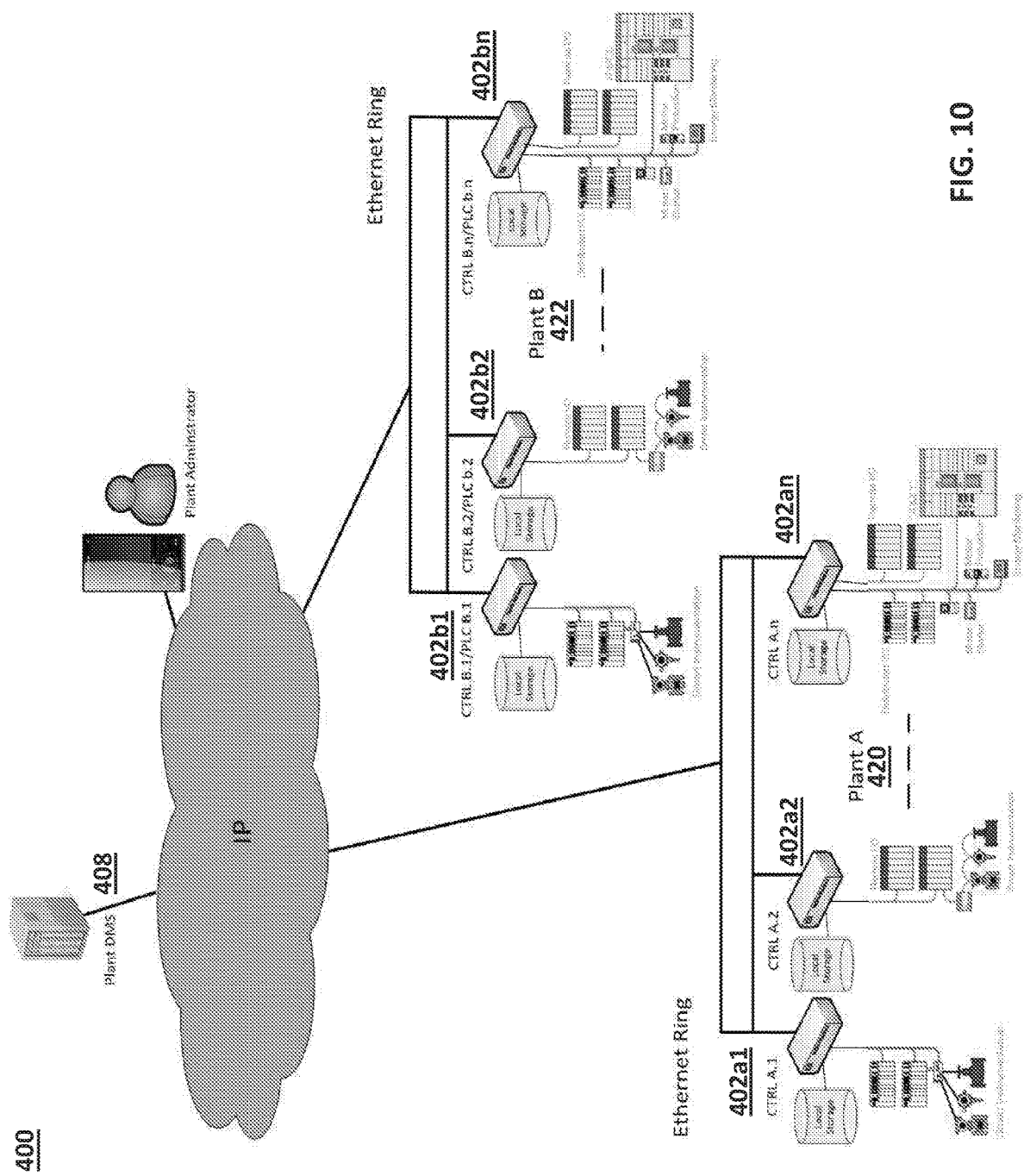
FIG. 10 illustrates an example of an industry control system in which one or more examples described herein may be used and/or implemented.

FIG. 10 illustrates an example of an industry control system 400 in which one or more examples described herein may be used and/or implemented. In an example (e.g., shown in FIG. 10), an industry owner may control a system using a set of different control units that may control industry equipment remotely using a back-end system such as the DMS (e.g., the first or current DMS). The control units (e.g., 402*a*1-402*an* and/or 402*b*1-402*bn*) may be shown as and/or denoted by CTRL, in FIG. 10 and may correspond to the M2M and/or IoT units or devices (e.g., 302*a-c*) in examples herein. The system 400 of FIG. 10 may include one or more different distinct plants 408 (e.g., which may be shown or denoted by Plant A 420 and Plant B 422). In one example, the current owner (e.g., the first organization or Organization A) may sell one of the plants such as Plant A 420 to another company (e.g., the second organization or Organization B) while keeping the ownership of Plant B 422. In examples, it may be costly for the new owner to manually configure the different control units, the CTRLs such as 402*a*1-402*an* (e.g., that may correspond to the M2M and/or IoT units or devices herein) that may be in or associated with in Plant A 420 to ensure the new owner may be able to remotely control Plant A 420. As such, according to the examples described herein, die new owner and/or die current owner may use a RS (not shown but that may be similar to or the same RS 314) that may provide a simpler, automatic and/or secure process or roll-over method for switching of ownership of all the equipment in Plant A may be beneficial as described herein.

For example, the new owner (e.g., the second organization or Organization B) may wish to have one or more of the following. The new owner may wish he or she may have full control of his or her plant units or CTRLs (e.g., 402*a*1-402*an*) in Plant A 420 after the organization has taken over the units. Additionally, the new owner may wish that the old owner, for example, from the moment of plant ownership switch, may not be able to access or receive information from the control units or CTRLs (e.g., 402*a*1-*an*) in Plant A 420. According to an example if the new owner may wish that the current owner may not be able to access information after transfer), the new owner may know and/or have knowledge of how many control units may be available in Plant A at the time of ownership switch.

Examples herein may provide one or more of the foregoing. For example, if or when the units at Plant A may be implemented such as when the plant may have been constructed or when an upgrade happened the units (e.g., 402*a*1-402*an*) may be registered by a common trusted party, the RS, and reset credentials may be provided and/or well-protected when stored on the different CTRLs (e.g., 402*a*1-402*an*) in plant A so that it may not be simple for the new owner to get hold of them. The examples herein may provide protection of the credentials, for example, when stored on the M2M and/or IoT units or devices (e.g., 402*a*1-402*an* and/or 402*b*1-402*bn* although not being transferred according to the example described herein). Further, in examples herein, technologies may be used including, for example, Provable Unclonable Functions (PUFs). In such examples that may be used herein, the verification credentials may be encrypted and integrity protected with a secret key that may be unique to the embedded chipset and/or may not be generated separately rather as a result of random variant ions at a chipset manufacturer. As such, in an example, the verification credentials may be installed at manufacture or at first time deployment of the unit and may then be available in clear text in, for example, protected on-chip volatile RAM. This makes it more difficult for an attacker to get reset credential information.

An additional example may include the reset credentials in a separate hardware module on each of the M2M and/or IoT units or devices that may be transferred in, for example, Plant A. However, as described herein, this may be more expensive in some examples. The use of the RS and installing reset credentials and manufacture or deployment may be a trade off between cost and/or security. For example, the cost to deploy the M2M and/or IoT units or devices may increases, but fast, secure and cheap ownership change may be accomplished. In an example, the use of the RS functionality may be run by an independent party.

Further, in an example, for the symmetric key based embodiment, a single and common secret may be shared between the units or devices in the set subject to roll-over. In such an example (e.g., if the current device owner such as Organization A managed to get hold of this key), that organization may be able to perform a mad-in-the-middle attack on the units or devices at the actual new credential transfer (e.g., after or during an ownership change and/or a roll-over). In an example (e.g., to defend against this), individual symmetric reset keys may be provide and/or used at each unit or device and/or the RS may manage these keys for the units or devices, which may be more complex and/or expensive). As such, the examples herein may provide a trade-off between security level and complexity to handle resource constraint devices that may have symmetric key capabilities.

FIG. 11A depicts a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 11A, the communications system 100 may include wireless transmit/receive units (WTRUs) 102a, 102h, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102h, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a and/or 114b may communicate with one or more of the WTRUs 102a, 102b, 102c, and/or 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, and/or 102c may implement a radio technology such as Universal Mobile Telecommunications System (UNITS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, and/or 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, and/or 102c may implement radio technologies such as IEEE 802.16 (i.e., Worldwide Interoperability for Microwave Access (WiMAX)), CDMA2000, CDMA2000 IX, CDMA2000 EV-DO, Interim Standard 2000 (15-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 11A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 11A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, and/or 102d. For example, the core network 106/107/109 may provide call control, billing services, mobile location-based services, pre-paid calling, Internet connectivity, video distribution, etc., and/or perform high-level security functions, such as user authentication. Although not shown in FIG. 11A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, and/or 102d to access the PSTN 108, the Internet 110, and/or other networks 112. The PSTN 108 may include circuit-switched telephone networks that provide plain old telephone service (POTS), The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, and/or 102d in the communications system 100 may include multi-mode capabilities, i.e., the WTRUs 102a, 102b, 102c, and/or 102d may include multiple transceivers for communicating with different wireless networks over different wireless links. For example, the WTRU 102c shown in FIG. 11A may be configured to communicate with the base station 114a, which may employ a cellular-based radio technology, and with the base station 114b, which may employ an IEEE 802 radio technology.

FIG. 11B depicts a system diagram of an example WTRU 102. As shown in FIG. 11B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 11B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 11B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 11B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 11C:
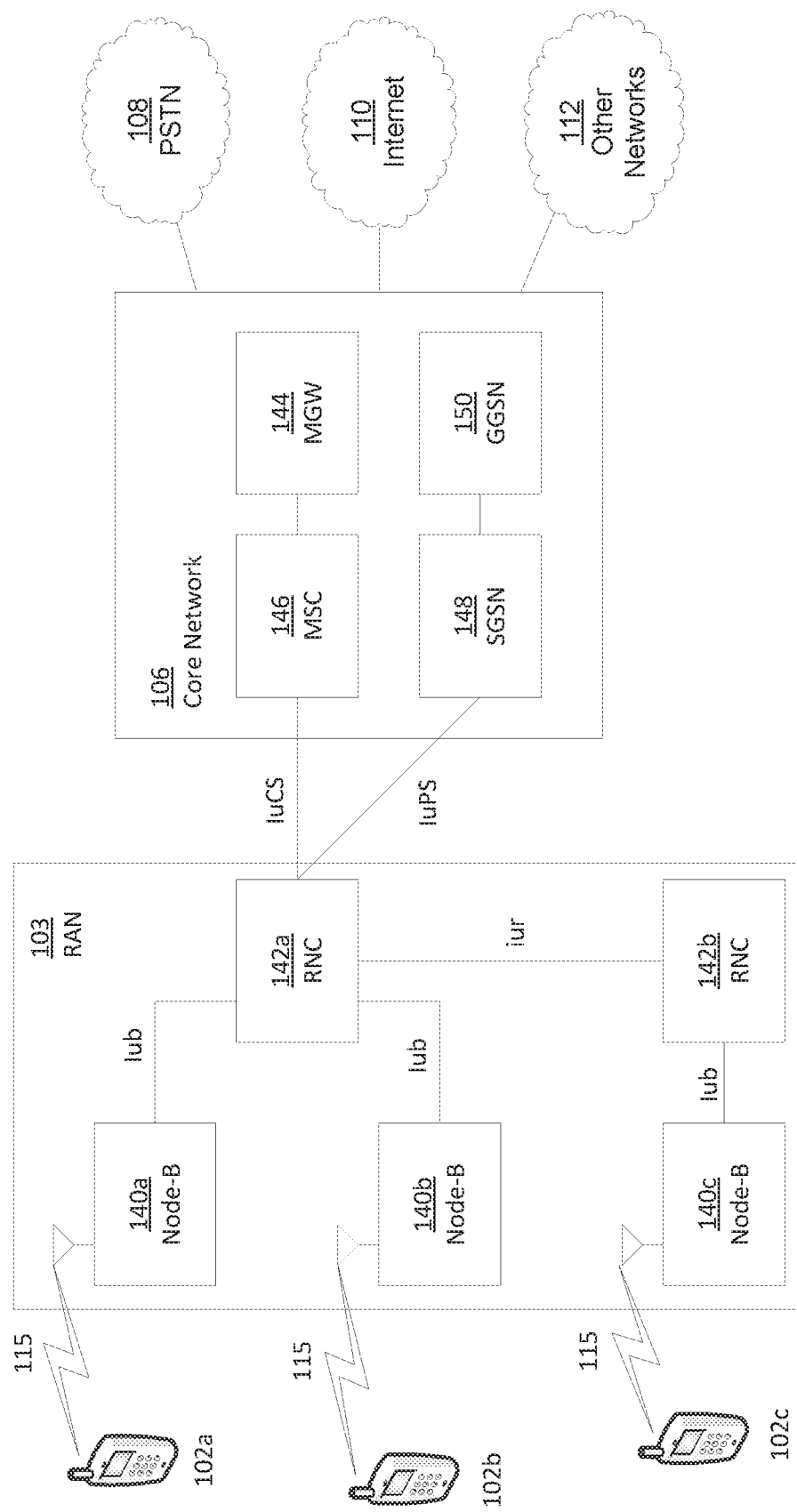
FIG. 11C depicts a system diagram of an example radio access network and an example core network that may be used within the communications system illustrated in FIG. 11A.

FIG. 11C depicts a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 1 IC, the RAN 103 may include Node-Bs 140a, 140b, and/or 140c, which may each include one or more transceivers for communicating with the WTRUs 102a, 102b, and/or 102c over the air interface 115. The Node-Bs 140a, 140b, and/or 140c may each be associated with a particular cell (not shown) within the RAN 103. The RAN 103 may also include RNCs 142a and/or 142b. It will be appreciated that the RAN 103 may include any number of Node-Bs and RNCs while remaining consistent with an embodiment.

As shown in FIG. 11C, the Node-Bs 140a and/or 140b may be in communication with the RNC 142a. Additionally, the Node-B 140c may be in communication with the RNC 142b. The Node-Bs 140a, 140h, and/or 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 11C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and/or 102c with access to circuit-switched networks, such as the PSTN 108, to facilitate communications between the WTRUs 102a, 102b, and/or 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 11D:
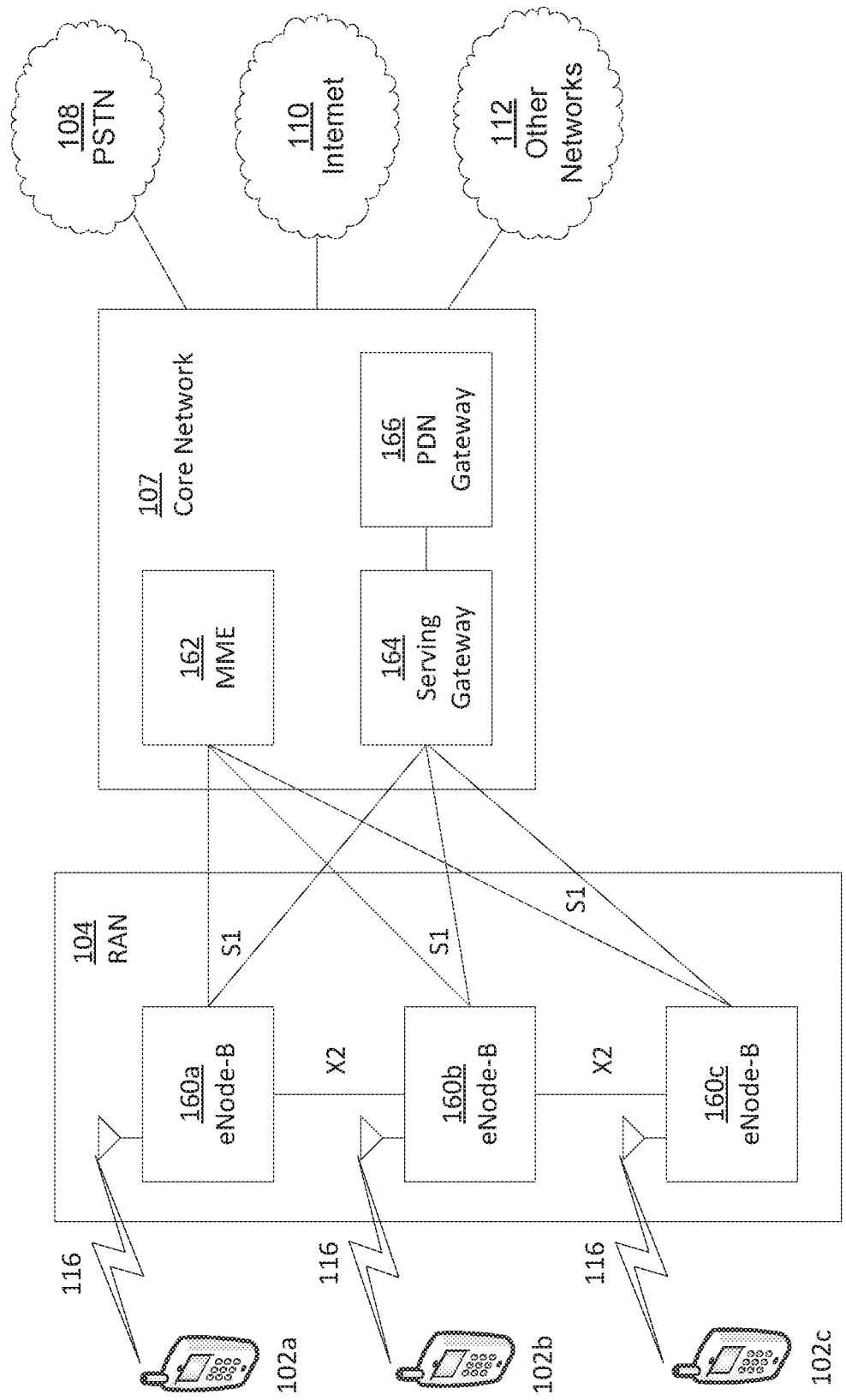
FIG. 11D depicts a system diagram of another example radio access network and an example core network that may be used within the communications system illustrated in FIG. 11A.

FIG. 11D depicts a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs while remaining consistent with an embodiment. The eNode-Bs 160a, 160b, and/or 160c may each include one or more transceivers for communicating with the WTRUs 102a, 102h, and/or 102c over the air interface 116. In one embodiment, the eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 11D, the eNode-Bs 160a, 160h, and/or 160c may communicate with one another over an X2 interface.

The core network 107 shown in FIG. 11D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an S1 interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RAN s (not shown) that employ other radio technologies, such as GSM or WCDMA.

The serving gateway 164 may be connected to each of the eNode-Bs 160a, 160b), and/or 160c in the RAN 104 via the S1 interface. The serving gateway 164 may generally route and forward user data packets to/from the WTRUs 102a, 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102b, and/or 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and/or 102c with access to the networks 112, which may include other wired or wireless networks that are owned and/or operated by other service providers.

Figure 11E:
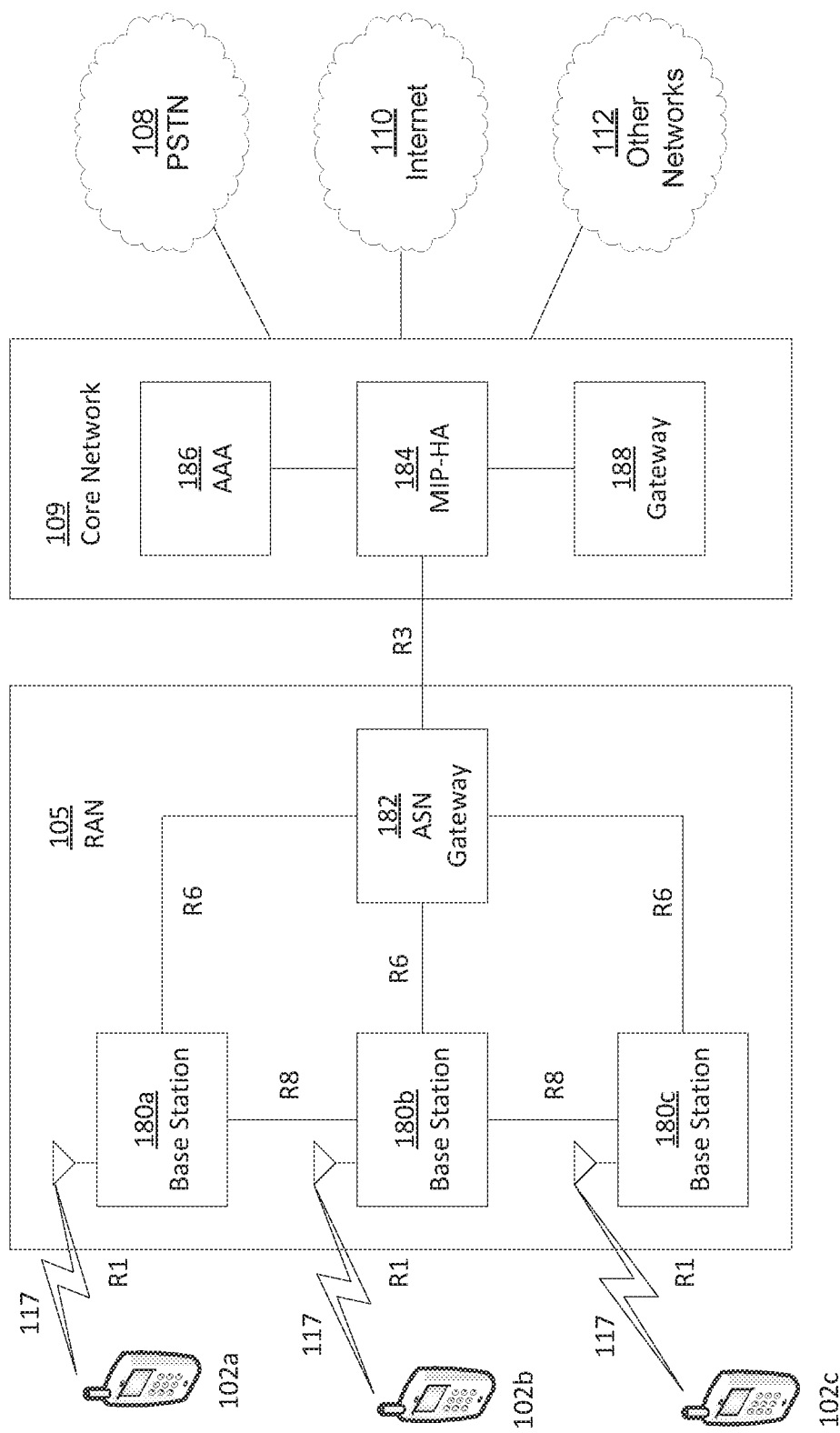
FIG. 11E depicts a system diagram of another example radio access network and an example core network that may be used within the communications system illustrated in FIG. 11A.

FIG. 11E depicts a system diagram of the RAN 105 and the core network 109 according to an embodiment. The RAN 105 may be an access service network (ASN) that employs IEEE 802.16 radio technology to communicate with the WTRUs 102a, 102b, and/or 102c over the air interface 117. As will be further discussed below, the communication links between the different functional entities of the WTRUs 102a, 102b, and/or 102c, the RAN 105, and the core network 109 may be defined as reference points.

As shown in FIG. 11E, the RAN 105 may include base stations 180a, 180b, and/or 180c, and an ASN gateway 182, though it will be appreciated that the RAN 105 may include any number of base stations and ASN gateways while remaining consistent with an embodiment. The base stations 180a, 180h, and/or 180c may each be associated with a particular cell (not shown) in the RAN 105 and may each include one or more transceivers for communicating with the WTRUs 102a, 102b, and/or 102c over the air interface 117. In one embodiment, the base stations 180a, 180b, and/or 180c may implement MIMO technology. Thus, the base station 180a, for example, may use multiple antennas to transmit wireless signals to, and receive wireless signals from, the WTRU 102a. The base stations 180a, 180b, and/or 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, and/or 102c and the RAN 105 may be defined as an R1 reference point that implements the IEEE 802.16 specification. In addition, each of the WTRUs 102a, 102b, and/or 102c may establish a logical interface (not shown) with the core network 109. The logical interface between the WTRUs 102a, 102b, and/or 102c and the core network 109 may be defined as an R2 reference point, which may be used for authentication, authorization, IP host configuration management, and/or mobility management.

The communication link between each of the base stations 180a, 180b, and/or 180c may be defined as an R8 reference point that includes protocols for facilitating WTRU handovers and the transfer of data between base stations. The communication link between the base stations 180a, 180b, and/or 180c and the ASN gateway 182 may be defined as an R6 reference point. The R6 reference point may include protocols for facilitating mobility management based on mobility events associated with each of the WTRUs 102a, 102b, and/or 102c.

As shown in FIG. 11E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and/or 102c to roam between different ASNs and/or different core networks. The MIP-HA 184 may provide the WTRUs 102a, 102b, and/or 102c with access to packet-switched networks, such as the Internet 110, to facilitate communications between the WTRUs 102a, 102b, and/or 102c and IP-enabled devices. The AAA server 186 may be responsible for user authentication and for supporting user services. The gateway 188 may facilitate interworking with other networks. For example, the gateway 188 may provide the WTRUs 102a, 102b, and/or 102c with access to circuit-switched networks, such as the PSTN 108, to facilitate communications between the WTRUs 102a, 102b, and/or 102c and traditional land-line communications devices. In addition, the gateway 188 may provide the WTRUs 102a, 102b, and/or 102c with access to the networks 112, which may include other wired or wireless networks that are owned and/or operated by other service providers.

Although not shown in FIG. 11E, it should, may, and/or will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and/or 102c between the RAN 105 and the other ASNs. The communication link between the core network 109 and the other core networks may be defined as an R5 reference, which may include protocols for facilitating interworking between home core networks and visited core networks.

Although the terms device, M2M, unit, IoT, UE, and/or WTRU may be used herein, it may and should be understood that the use of such terms may be used interchangeably and, as such, may not be distinguishable.

Further, although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor.

Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station. RNC, or any host computer.

What is claimed:

1. A method for transferring control of a machine-to-machine (M2M) device from a first device management server (DMS) to a second DMS, based on authorization from a reset server, the method comprising:
storing, in the M2M device, a reset credential from the reset server for validating a roll-over token generated by the reset server;
receiving, in the M2M device, from the reset server, the roll-over token, wherein the M2M device receives the roll-over token directly from the reset server or from the reset server via the first DMS;
determining, in the M2M device, a validity of the roll-over token based on the stored reset credential, wherein the validity determination includes the M2M device checking a Message Authentication Code (MAC) or a digital signature;
extracting, in the M2M device, from the roll-over token, a uniform resource identifier (URI) for the second DMS;
establishing a connection from the M2M device to the second DMS based on the extracted URI;
storing, in the M2M device, a second DMS credential and deleting a first DMS credential associated with the first DMS; and
establishing a secure connection with the second DMS based on the second DMS credential.

2. The method of claim 1, wherein the roll-over token is generated by the reset server in response to a request from one of the first DMS and the second DMS.

3. The method of claim 1, further comprising one of extracting the second DMS credential from the roll-over token and receiving the second DMS credential from the second DMS.

4. The method of claim 1, wherein the roll-over token comprises a secure key.

5. The method of claim 4, wherein the secure key comprises symmetric key-based credentials or public key-based credentials.

6. The method of claim 1, further comprising decrypting the roll-over token.

7. The method of claim 1, further comprising performing a mutual authentication between the M2M device and the second DMS before establishing a secure connection with the second DMS.

8. The method of claim 7, further comprising establishing a secure channel with the second DMS based on the first DMS credential before establishing the secure connection with the second DMS.

9. The method of claim 7, further comprising establishing a secure channel with the second DMS based on a temporary DMS credential before establishing the secure connection with the second DMS.

10. The method of claim 7, wherein the mutual authentication and secure channel between the second DMS and the M2M device is established based on an M2M device key and a symmetric key.

11. A machine-to-machine (M2M) device that can transfer control of the M2M device from a first device management server (DMS) to a second DMS, based on authorization from a reset server, comprising:
a memory configured to store a reset credential for validation of a roll-over token generated by the reset server;
a processor configured to:
store, in the M2M device, the reset credential, wherein the reset credential is received in the M2M device from the reset server;
receive, in the M2M device, from the reset server, the roll-over token, wherein the M2M device receives the roll-over token directly from the reset server or from the reset server via the first DMS;
determine, in the M2M device, a validity of the roll-over token based on the stored reset credential, wherein the validity determination includes the M2M device checking a Message Authentication Code (MAC) or a digital signature;
extract, in the M2M device, from the roll-over token, a uniform resource identifier (URI) for the second DMS;
establish a connection from the M2M device to the second DMS based on the extracted URI;
store, in the M2M device memory, a second DMS credential and delete a first DMS credential associated with the first DMS; and
establish a secure connection with the second DMS based on the second DMS credential.

12. The M2M device of claim 11, wherein the received roll-over token was generated by the reset server in response to a request from one of the first DMS and the second DMS.

13. The M2M device of claim 11, wherein the processor is further configured to either extract the second DMS credential from the roll-over token or receive the second DMS credential from the second DMS.

14. The M2M device of claim 11, wherein the roll-over token comprises a secure key.

15. The M2M device of claim 14, wherein the secure key comprises symmetric key-based credentials or public key-based credentials.

16. The M2M device claim 11, wherein the processor is further configured to decrypt the roll-over token.

17. The M2M device of claim 11, wherein the processor is further configured to perform a mutual authentication between the M2M device and the second DMS before establishing a secure connection with the second DMS.

18. The M2M device of claim 17, wherein the processor is further configured to establish the mutual authentication and secure channel between the second DMS and the M2M device based on an M2M device key and a symmetric key.

19. The M2M device of claim 17, wherein the processor is further configured to establish a secure channel with the second DMS based on the first DMS credential before establishing the secure connection with the second DMS.

20. The M2M device of claim 17, wherein the processor is further configured to establish a secure channel with the second DMS based on a temporary DMS credential before establishing the secure connection with the second DMS.

* * * * *